US012674516B2

(12) United States Patent　　(10) Patent No.:　US 12,674,516 B2
　　Bludau et al.　　　　　　　　　　(45) Date of Patent:　　　Jul. 7, 2026

(54) CHECK VALVE

(71) Applicant: Proserv Gilmore Valve LLC, Houston, TX (US)

(72) Inventors: Ryan Bludau, Katy, TX (US); Christopher Clark Barnes, Houston, TX (US); Stuart Macintyre, Bentonville, AR (US)

(73) Assignee: Proserv Gilmore Valve LLC, Houston, TX (US)

( * ) Notice: Subject to any disclaimer, the term of this patent is extended or adjusted under 35 U.S.C. 154(b) by 0 days.

(21) Appl. No.: 18/904,539

(22) Filed: Oct. 2, 2024

(65) Prior Publication Data

US 2025/0116341 A1　　Apr. 10, 2025

Related U.S. Application Data

(60) Provisional application No. 63/587,940, filed on Oct. 4, 2023.

(51) Int. Cl.
　F16K 15/06　　　　(2006.01)
(52) U.S. Cl.
　CPC .................................. F16K 15/063 (2013.01)
(58) Field of Classification Search
　CPC .............................. F16K 15/063; F16K 15/026
　See application file for complete search history.

(56) References Cited

U.S. PATENT DOCUMENTS

| | | |
|---|---|---|
| 402,600 A | 5/1889 | Kemp |
| 1,654,642 A | 1/1928 | Geissinger |
| 1,751,664 A | 3/1930 | Smith |
| 1,944,518 A * | 1/1934 | Lovekin ................ F16K 17/383 |
| | | 137/538 |
| 2,140,735 A | 12/1938 | Gross |
| 2,163,472 A * | 6/1939 | Shimer ................ F16K 15/063 |
| | | 137/902 |

(Continued)

FOREIGN PATENT DOCUMENTS

| | | |
|---|---|---|
| CH | 469928 A | 3/1969 |
| DE | 102014224979 A1 | 6/2016 |

(Continued)

OTHER PUBLICATIONS

PCT International Search Report and Written Opinion dated Dec. 1, 2017, for International Application No. PCT/US2017/051567, 12 pages.

(Continued)

*Primary Examiner* — P. Macade Nichols

(74) *Attorney, Agent, or Firm* — Patterson + Sheridan, LLP

(57)　　　　　　　　ABSTRACT

A valve includes an inlet, an annular seat, a poppet having an annular body having an inner volume and an annular seat facing surface selectively contactable with the annular seat, and at least one alignment pin extending inwardly of the inner volume of the poppet, an outlet fluidly connectable to the inlet; and an alignment tube disposed between the outlet and the inlet, the alignment tube extending inwardly of the inner volume of the poppet and including an alignment feature thereon configured to at least partially receive the alignment pin therein when the annular seat facing surface of the poppet is retracted from the seat.

20 Claims, 12 Drawing Sheets

(56) References Cited

U.S. PATENT DOCUMENTS

| | | | |
|---|---|---|---|
| 2,233,649 A * | 3/1941 | Stahl | F16K 15/063 |
| | | | 137/543.13 |
| 2,311,851 A | 2/1943 | McClure | |
| 2,560,841 A | 7/1951 | Bishop | |
| 2,605,108 A | 7/1952 | Stephens | |
| 2,685,296 A | 8/1954 | Boosman | |
| 2,729,226 A | 1/1956 | Jones | |
| 2,799,523 A | 7/1957 | Parker | |
| 2,811,979 A | 11/1957 | Presnell | |
| 2,821,972 A | 2/1958 | Banker | |
| 2,847,027 A | 8/1958 | Kumpman | |
| 2,862,520 A | 12/1958 | Cordova | |
| 2,867,463 A | 1/1959 | Snider | |
| 2,892,644 A | 6/1959 | Collins | |
| 2,906,290 A | 9/1959 | Harding et al. | |
| 2,973,746 A | 3/1961 | Jupa | |
| 3,022,794 A | 2/1962 | Pippenger | |
| 3,114,391 A | 12/1963 | Kurtz | |
| 3,145,723 A | 8/1964 | Chorkey | |
| 3,189,049 A | 6/1965 | Carlson | |
| 3,219,060 A | 11/1965 | Pearl et al. | |
| 3,225,786 A | 12/1965 | Elliott | |
| 3,279,805 A | 10/1966 | Quinson | |
| 3,316,930 A | 5/1967 | Garduer | |
| 3,352,394 A | 11/1967 | Longshore | |
| 3,421,533 A | 1/1969 | Conn | |
| 3,474,828 A | 10/1969 | Wheeler et al. | |
| 3,485,225 A | 12/1969 | Bailey et al. | |
| 3,533,431 A | 10/1970 | Kuenzel et al. | |
| 3,536,085 A | 10/1970 | Taplin | |
| 3,540,695 A | 11/1970 | Taylor | |
| 3,587,647 A | 6/1971 | Walters | |
| 3,598,148 A | 8/1971 | Kroffke | |
| 3,635,436 A | 1/1972 | Tillman | |
| 3,662,950 A | 5/1972 | McIntosh et al. | |
| 3,683,694 A | 8/1972 | Granberg | |
| 3,749,122 A | 7/1973 | Gold | |
| 3,797,525 A | 3/1974 | Lieser | |
| 3,913,620 A | 10/1975 | Pauliukonis | |
| 3,949,645 A | 4/1976 | Masclet | |
| 3,978,888 A | 9/1976 | Naono | |
| 4,220,174 A | 9/1980 | Spitz | |
| 4,240,634 A | 12/1980 | Wiczer | |
| 4,253,481 A | 3/1981 | Sarlls, Jr. | |
| 4,263,938 A | 4/1981 | Peters | |
| 4,281,677 A | 8/1981 | Hoffman | |
| 4,336,946 A | 6/1982 | Wheeler | |
| 4,396,071 A | 8/1983 | Stephens | |
| 4,444,216 A | 4/1984 | Loup | |
| 4,457,489 A | 7/1984 | Gilmore | |
| 4,475,568 A | 10/1984 | Loup | |
| 4,491,154 A | 1/1985 | Peters | |
| 4,493,335 A | 1/1985 | Watson | |
| 4,554,940 A | 11/1985 | Loup | |
| 4,793,590 A | 12/1988 | Watson | |
| 4,856,557 A | 8/1989 | Watson | |
| 4,877,057 A | 10/1989 | Christensen | |
| 4,890,645 A | 1/1990 | Andersen | |
| 4,968,197 A | 11/1990 | Chen | |
| 5,035,265 A | 7/1991 | Chen | |
| 5,069,240 A | 12/1991 | Kurkjian, Jr. | |
| 5,190,078 A | 3/1993 | Stoll et al. | |
| 5,222,521 A | 6/1993 | Kihlberg | |
| 5,301,637 A | 4/1994 | Blount | |
| 5,771,931 A | 6/1998 | Watson | |
| 5,771,993 A | 6/1998 | Anderson et al. | |
| 5,778,918 A | 7/1998 | McLelland | |
| 5,797,431 A | 8/1998 | Adams | |
| 5,901,749 A | 5/1999 | Watson | |
| 6,041,804 A | 3/2000 | Chatufale | |
| 6,257,268 B1 | 7/2001 | Hope et al. | |
| 6,264,206 B1 | 7/2001 | Hashizawa et al. | |
| 6,296,008 B1 | 10/2001 | Boyer et al. | |
| 6,318,400 B1 | 11/2001 | Hope et al. | |
| 6,382,256 B2 | 5/2002 | Kim et al. | |
| 6,520,478 B1 | 2/2003 | Hope et al. | |
| 6,523,613 B2 | 2/2003 | Rayssiguier et al. | |
| 6,651,696 B2 | 11/2003 | Hope et al. | |
| 6,668,861 B2 | 12/2003 | Williams | |
| 6,702,024 B2 | 3/2004 | Neugebauer | |
| 6,843,266 B2 | 1/2005 | Hope et al. | |
| 6,901,960 B2 | 6/2005 | Roberts et al. | |
| 6,983,803 B2 | 1/2006 | Watson et al. | |
| 7,000,890 B2 | 2/2006 | Bell et al. | |
| 7,073,590 B2 | 7/2006 | Neugebauer et al. | |
| 7,159,605 B2 | 1/2007 | Thrash, Jr. et al. | |
| 7,428,913 B2 | 9/2008 | Benson | |
| 7,438,086 B2 | 10/2008 | Bento et al. | |
| 7,520,297 B2 | 4/2009 | Bell et al. | |
| 7,628,170 B2 | 12/2009 | Kok-Hiong et al. | |
| 7,784,553 B2 | 8/2010 | Moreno | |
| 7,959,161 B2 | 6/2011 | Seki et al. | |
| 8,052,119 B2 | 11/2011 | Numazaki et al. | |
| 8,245,729 B2 | 8/2012 | Zub | |
| 8,246,055 B2 | 8/2012 | Asplund et al. | |
| 8,342,202 B2 | 1/2013 | Nishio et al. | |
| 8,397,742 B2 | 3/2013 | Thrash et al. | |
| 8,408,244 B2 | 4/2013 | Gilcher | |
| 8,453,678 B2 | 6/2013 | Neff et al. | |
| 8,469,059 B1 | 6/2013 | Forst | |
| 8,474,792 B2 | 7/2013 | Kubo et al. | |
| 8,490,652 B2 | 7/2013 | Bohaychuk et al. | |
| 8,627,893 B2 | 1/2014 | Otto et al. | |
| 9,121,244 B2 | 9/2015 | Loretz et al. | |
| 9,133,944 B2 | 9/2015 | Haeckel et al. | |
| 9,297,462 B2 | 3/2016 | Hattori et al. | |
| 9,334,946 B1 | 5/2016 | Mason | |
| 9,354,638 B2 | 5/2016 | Rebreanu et al. | |
| 9,423,031 B2 | 8/2016 | Weintraub et al. | |
| 9,719,600 B2 | 8/2017 | Patterson | |
| 9,874,282 B2 | 1/2018 | Wetzel et al. | |
| 10,012,325 B2 | 7/2018 | Bohaychuk et al. | |
| 11,041,358 B2 | 6/2021 | Jones et al. | |
| 2004/0047748 A1 | 3/2004 | Roberts et al. | |
| 2004/0173976 A1 | 9/2004 | Boggs | |
| 2004/0262007 A1 | 12/2004 | Neugebauer et al. | |
| 2005/0028864 A1 | 2/2005 | Thrash et al. | |
| 2005/0067031 A1 | 3/2005 | Lee | |
| 2006/0137744 A1 | 6/2006 | Anastas | |
| 2006/0237064 A1 | 10/2006 | Benson | |
| 2007/0000544 A1 | 1/2007 | Thompson | |
| 2007/0069576 A1 | 3/2007 | Suzuki | |
| 2007/0113906 A1 | 5/2007 | Sturman et al. | |
| 2010/0044605 A1 | 2/2010 | Veilleux | |
| 2010/0140881 A1 | 6/2010 | Matsuo | |
| 2010/0154896 A1 | 6/2010 | Thrash, Jr. et al. | |
| 2010/0243084 A1 | 9/2010 | Yoshioka et al. | |
| 2011/0253240 A1 | 10/2011 | Otto et al. | |
| 2012/0248358 A1 | 10/2012 | Pic et al. | |
| 2012/0292550 A1 | 11/2012 | Meek | |
| 2013/0032222 A1 | 2/2013 | Bresnahan | |
| 2013/0037736 A1 | 2/2013 | Bresnahan | |
| 2013/0146303 A1 | 6/2013 | Gustafson | |
| 2013/0181154 A1 | 7/2013 | Robison et al. | |
| 2013/0220441 A1 | 8/2013 | Zanettacci | |
| 2014/0116551 A1 | 5/2014 | Smith | |
| 2014/0377111 A1 | 12/2014 | Bagagli et al. | |
| 2015/0060715 A1 | 3/2015 | Hoang | |
| 2015/0152959 A1 | 6/2015 | Mangiagli et al. | |
| 2015/0191996 A1 | 7/2015 | Weintraub | |
| 2015/0191997 A1 | 7/2015 | Weintraub et al. | |
| 2015/0276072 A1 | 10/2015 | Rebreanu et al. | |
| 2015/0276083 A1 | 10/2015 | Druhan et al. | |
| 2015/0362083 A1 | 12/2015 | Patterson | |
| 2015/0369002 A1 | 12/2015 | Patterson | |
| 2016/0103456 A1 | 4/2016 | Cho et al. | |
| 2016/0123478 A1 | 5/2016 | Wetzel et al. | |
| 2016/0230900 A1 | 8/2016 | Schulz et al. | |
| 2016/0258531 A1 | 9/2016 | Ito et al. | |
| 2016/0258537 A1 | 9/2016 | Heiderman et al. | |
| 2017/0037984 A1 | 2/2017 | Frippiat et al. | |
| 2017/0097100 A1 | 4/2017 | Patterson | |
| 2017/0175916 A1 | 6/2017 | Huynh et al. | |
| 2017/0189730 A1 | 7/2017 | Ernfjall | |

(56)                References Cited

U.S. PATENT DOCUMENTS

| | | | |
|---|---|---|---|
| 2017/0220054 | A1 | 8/2017 | Zhu et al. |
| 2017/0241563 | A1 | 8/2017 | Simpson |
| 2017/0260831 | A1 | 9/2017 | Green |
| 2017/0314689 | A1 | 11/2017 | Osterbrink et al. |
| 2017/0370481 | A1 | 12/2017 | Glazewski |
| 2018/0073652 | A1 | 3/2018 | Weintraub |
| 2019/0316687 | A1 | 10/2019 | Bonanno |
| 2020/0096114 | A1 | 3/2020 | Stetzer et al. |
| 2020/0124181 | A1 | 4/2020 | Liu et al. |

FOREIGN PATENT DOCUMENTS

| | | | |
|---|---|---|---|
| DE | 102018107053 | A1 | 10/2018 |
| JP | 2019086086 | A | 6/2019 |
| KP | 20050045760 | A | 5/2005 |
| KR | 20160115751 | A | 10/2016 |
| WO | 2013113827 | A1 | 8/2013 |
| WO | 2020236853 | A1 | 11/2020 |

OTHER PUBLICATIONS

PCT International Search Report and Written Opinion dated Jan. 31, 2018, for International Application No. PCT/US2017/051550, 22 pages.

PCT International Search Report and Written Opinion dated Jun. 23, 2015, for International Application No. PCT/US2014/062114, 10 pages.
PCT International Search Report and Written Opinion dated Nov. 14, 2019, for International Application No. PCT/US2019/046323, 13 pages.
PCT/US2020/067625, International Search Report and Written Opinion dated May 4, 2021, 15 pages.
PCT/US2021/044762, International Search Report and Written Opinion dated Oct. 27, 2021, 12 pages.
PCT/US2021/063521, International Search Report and Written Opinion dated Feb. 14, 2022, 20 pages.
India Application No. 2021137010322, Examination Report dated Jun. 5, 2021, 6 pages.
Indonesian Patent Application No. P00202101829-TA, Office Action dated Jul. 4, 2022, 2 pages.
PCT/US2022/080763, International Search Report and Written Opinion dated Mar. 27, 2023, 10 pages.
Indian Application No. 202217042243, Examination Report dated Feb. 7, 2023, 6 pages.
European Patent Application No. 20853585.6, Office Action dated Sep. 5, 2023, 6 pages.
Chinese Application No. 201980064890.3, Office Action dated Sep. 15, 2022, 22 pages.

* cited by examiner

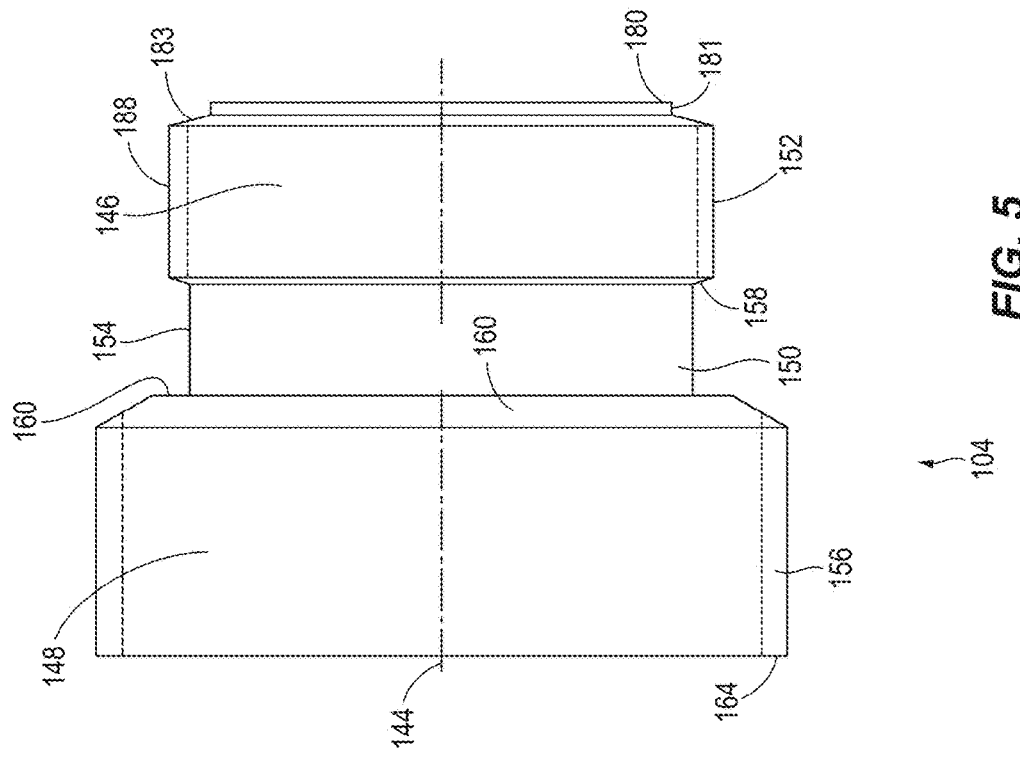
FIG. 5
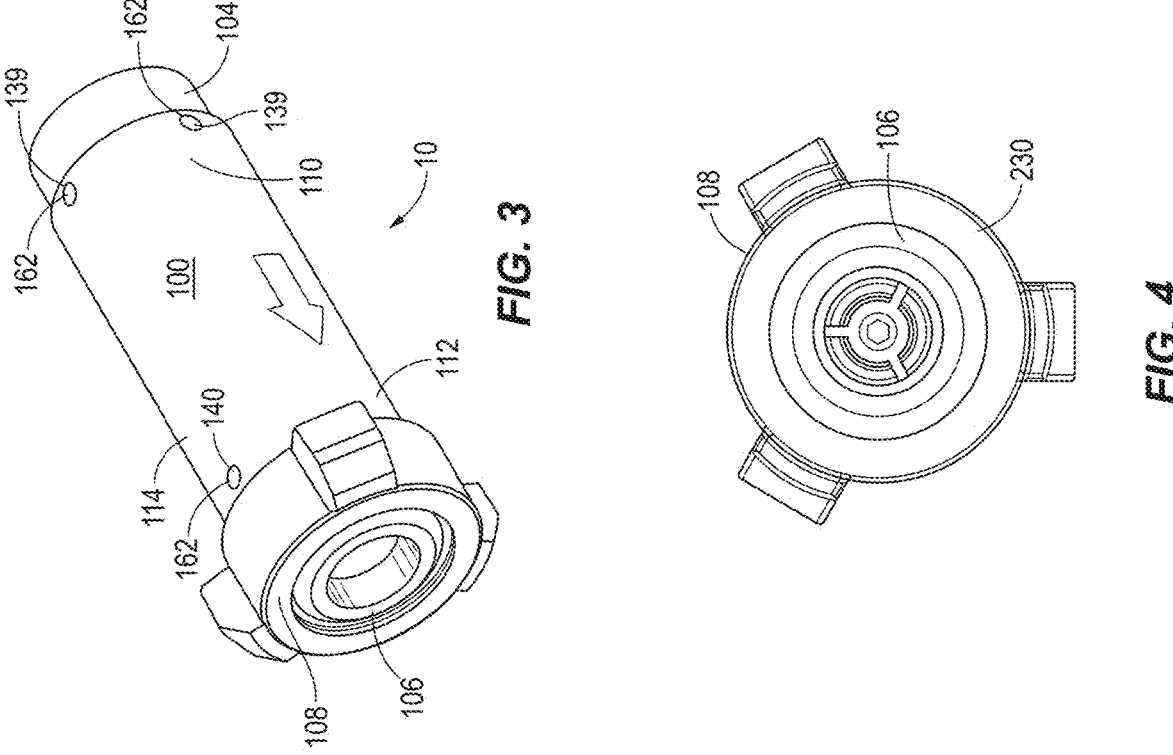
FIG. 3
FIG. 4

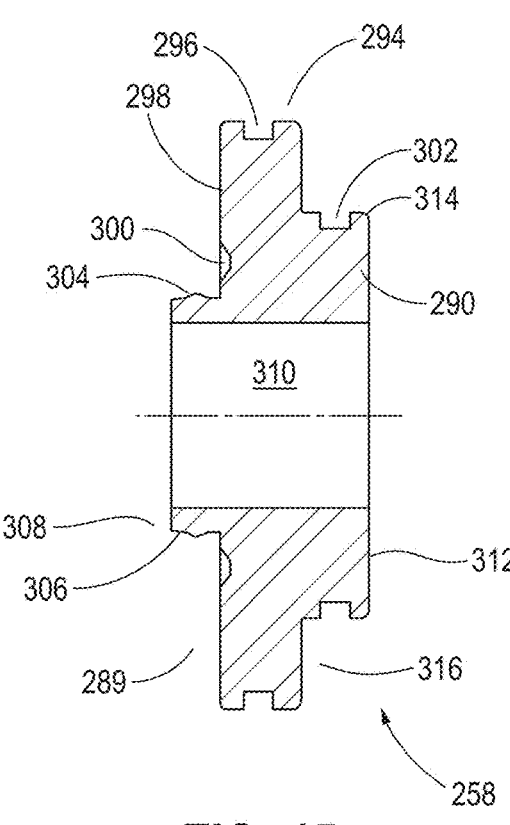
FIG. 15
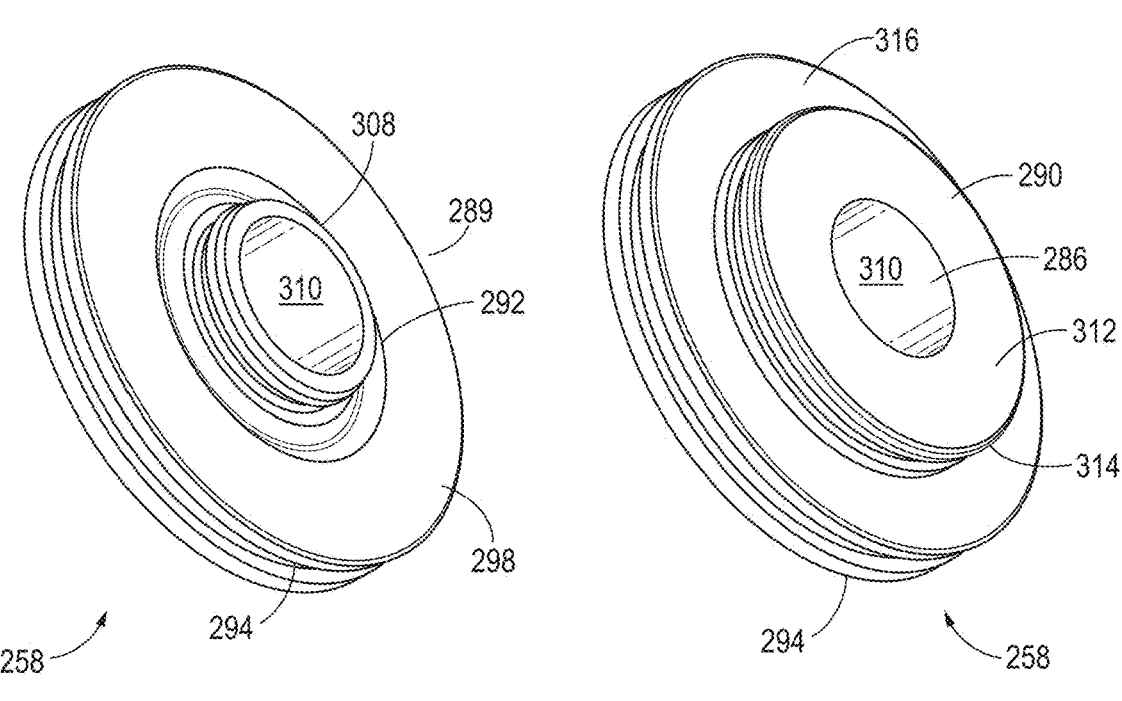
FIG. 16A                  FIG. 16B

CHECK VALVE

CROSS-REFERENCE TO RELATED APPLICATIONS

This application claims benefit of U.S. provisional patent application Ser. No. 63/587,940, filed Oct. 4, 2023, which is herein incorporated by reference.

BACKGROUND

Field

Valves, such as check valves, are used to relieve over-pressure conditions in equipment, fluid storage, fluid lines, herein the equipment being protected, and they operate by venting the fluid in the equipment to a lower pressure environment, for example to an atmospheric pressure environment. Once fluid sufficient to reduce the pressure in the equipment being protected to a desired or rated pressure is vented from the equipment being protected, the check valve closes to seal off the fluid in the equipment from the lower pressure vent environment.

Description of the Related Art

Check valves are used in high pressure fluid circuits such as the equipment and fluid supply lines used for fracing. In these applications, the fluid is injected in to a subsurface formation to extend or create fractures therein, and particulates in the fluid, commonly known as proppants, are used to hold the fractures or cracks open after the high pressure on the fluid is removed. The fluid is commonly injected using one or more pumps in series, to achieve the fluid pressure required to cause or extend the fractures in the formation, and the fluid can be recirculated out of the subsurface formation. If a pressure spike occurs in the fluid, it can cause catastrophic failures of the equipment used to pressurize the fracing fluid, the fluid lines, or both. Thus, a pressure relief valve, such as a check valve, is employed in the high pressure fracing fluid delivery conduit to rapidly relieve an overpressure condition therein.

Traditional check valves, for example ones with a check ball that is spring biased against a spherical seat, or a convex conical dart that is spring biased into a concave conical seat, are unreliable for sealing where abrasives are present, as the abrasive can get between the seat and sealing element and prevent the valve from closing after relieving a high pressure spike. Additionally, the abrasive laden fluid can flow through the relief valve at a high velocity, eroding away the interior surfaces thereof to the detriment of the performance and life of the relief valve.

Therefore, there is a need for a check valve having greater resistance to the negative side effects of having abrasive laden fluids flowing therethrough.

SUMMARY

In one aspect, a valve includes an inlet, an annular seat, a poppet having an annular body having an inner volume and an annular seat facing surface selectively contactable with the annular seat, and at least one alignment pin extending inwardly of the inner volume of the poppet, an outlet fluidly connectable to the inlet; and an alignment tube disposed between the outlet and the inlet, the alignment tube extending inwardly of the inner volume of the poppet and including an alignment feature thereon configured to at least partially receive the alignment pin therein when the annular seat facing surface of the poppet is retracted from the seat.

In another aspect, a valve includes an inlet, an annular seat, an outlet, a poppet having an annular body having an inner volume, an annular first end wall and an annular second wall, the annular second wall facing the annular seat and selectively contactable with the annular seat, and an inner circumferential surface extending inwardly of the poppet from the first annular end wall, a support tube extending inwardly of the inner volume of the poppet, the support tube including an outer circumferential wall having a circumference less than the circumference of the inner circumferential surface of the poppet such that a gap is present therebetween, and a wiper disposed adjacent the first annular wall of the poppet an including a circumferential seal spanning the gap between an inner circumferential surface of the poppet and a first outer circumferential surface of the support tube.

In another aspect, a valve includes a housing having a central through bore, a first threaded housing end and a second threaded housing end, a first body having a first body flow passage and a first body threaded end, and a first attachment surface disposed between the first threaded end and the first body flow passage, a second body having a second body flow passage and a second body threaded end, and a second attachment surface disposed between the second threaded end and the second body flow passage, the first body threaded end received in the first threaded housing and, and a first retainer extending from the housing and into contact with the first attachment surface, and the second body threaded end received in the second threaded housing and, and a second retainer extending from the housing and into contact with the second attachment surface.

In another aspect, a valve includes a housing having a central through bore, a first housing open end and a second housing open end, a first body having a first body flow passage and a retaining ring counterbore, at least a portion of the first body received in the first housing open end, a second body having a second body flow passage and at least a portion of the second body received in the first housing open end, a seat assembly comprising a first retaining ring, a second retaining ring, and a seat supported by the first retaining ring and the second retaining ring, and a poppet reciprocally received in the housing.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 3 is an isometric view of the check valve of FIG. 1.

FIG. 4 is an end view of the check valve of FIG. 1.

FIG. 5 is a side view of the first body of FIG. 1.

FIG. 15 is a sectional view of a first retaining ring of the seat assembly of the valve.

FIG. 16*a* is an isometric view of the first retaining ring of FIG. 15 showing a first side thereof.

FIG. 16*b* is an isometric view of the first retaining ring of FIG. 15 showing a second side thereof.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
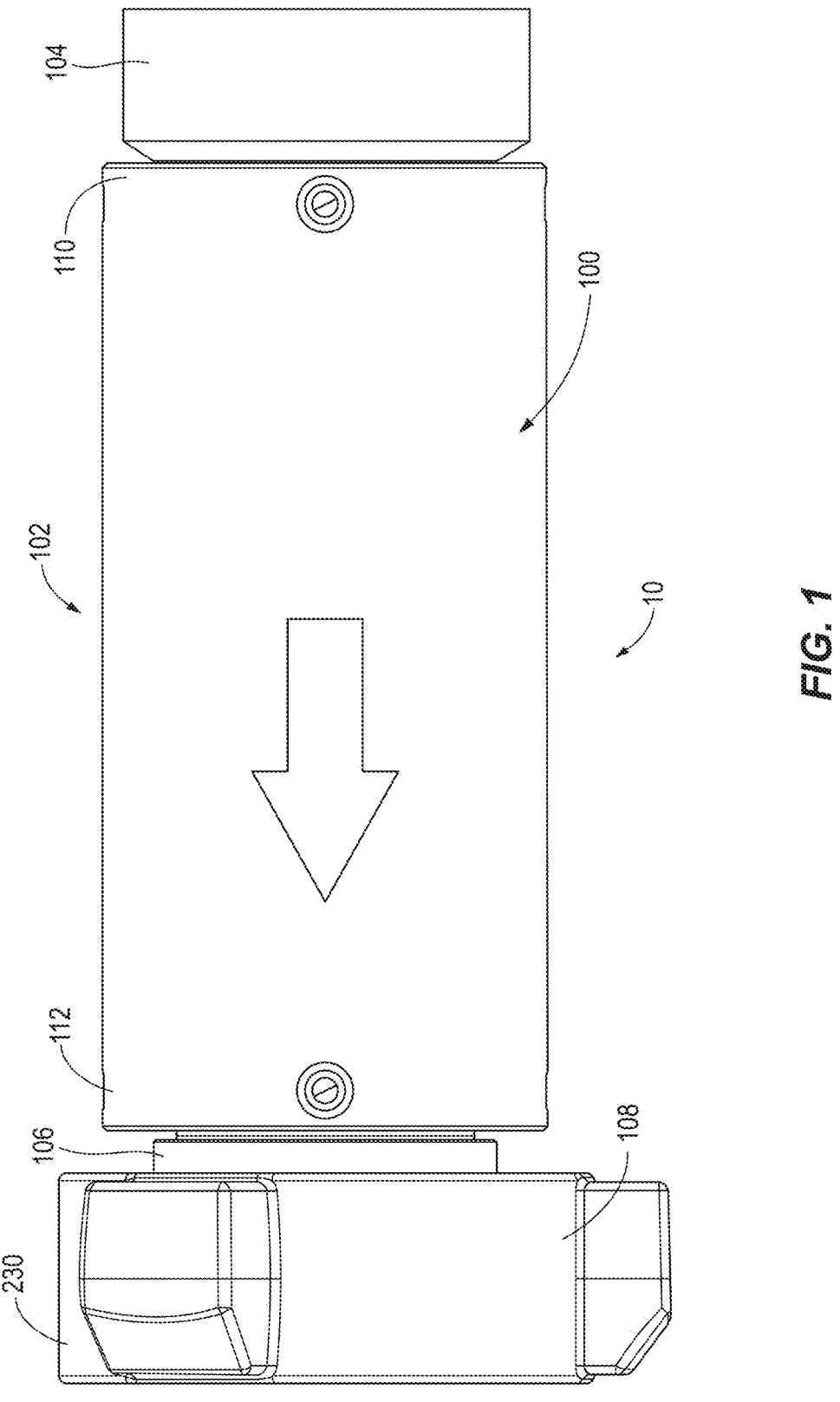
FIG. 1 is a side view of a check valve hereof, showing the exterior of the valve housing, a first body providing the valve inlet, and a second body providing the valve outlet.

Herein is provided a pressure relief valve 10, more specifically a check valve configured for high-pressure abrasive bearing fluid or abrasive laden fluid flow applications. Referring initially to FIG. 1, valve 10 here includes a valve body 100 having a housing 102 connected, at a first end 110 thereof to a first body 104 configured as the valve inlet and at an opposed second end 112 thereof, to a second body 106 configured as the valve outlet. An outlet connector 108 (FIGS. 3 and 4), here in the form of a tri-lobed wing nut, is provided about the second body 106 for connection of the second body 106 to an outlet line, venting line, or the like.

Figure 2:
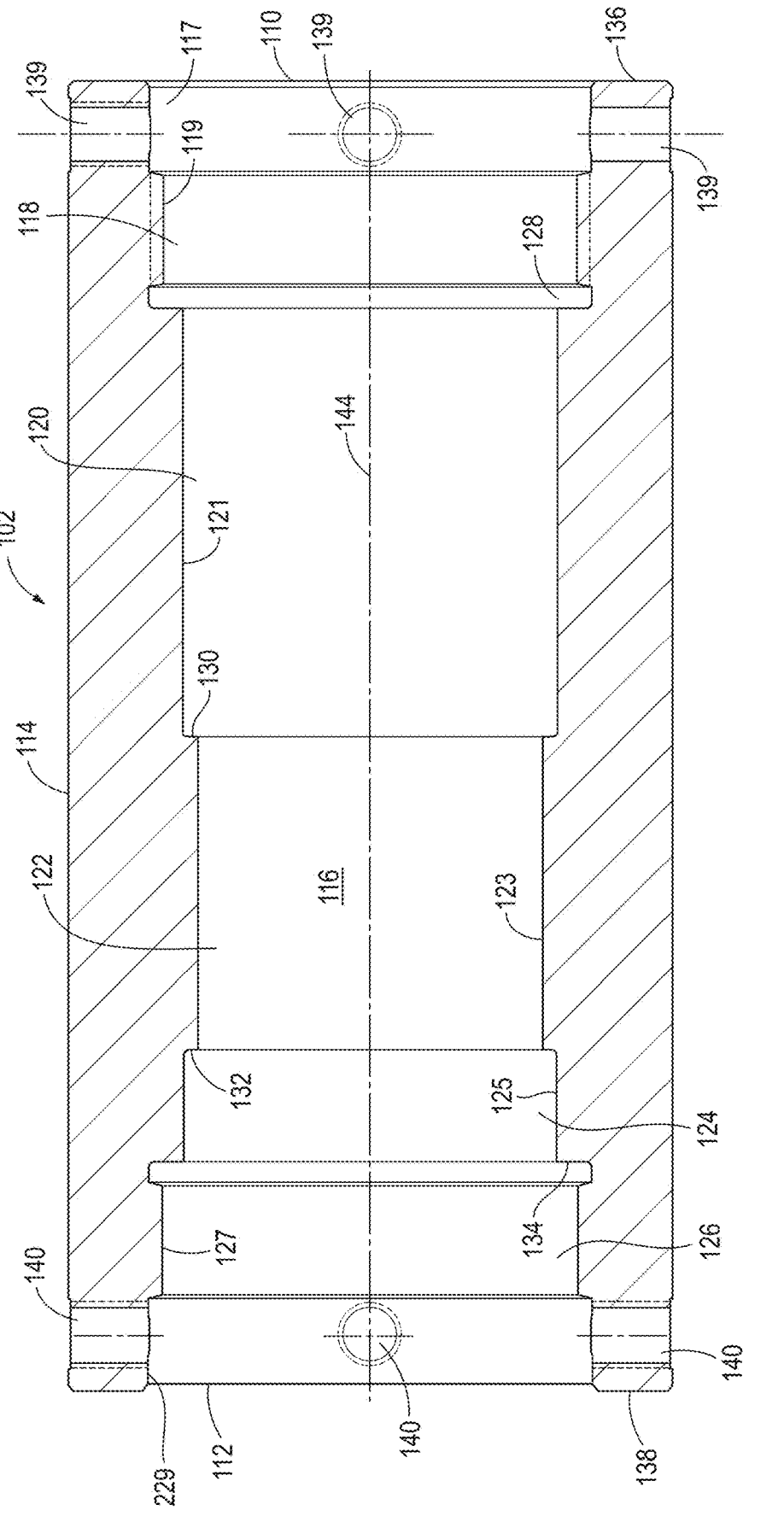
FIG. 2 is a sectional view of the valve housing of the check valve of FIG. 1.

Referring to FIGS. 1 and 2, housing 102 here is a generally right annular body having an outer cylindrical surface 114 and a central stepped bore 116 extending therethrough from the first end 110 to the outlet at the second end 112 thereof to form a flow passage through the housing 102. Stepped bore 116 here includes a first body receiving bore 118 extending inwardly of the first end 110 thereof from a first annular end face 136 of the housing to a first annular ledge 128 located inwardly of the first end 110 thereof. First body receiving bore 118 includes a right circumferential first retaining bore surface 117 extending inwardly from the first annular end face 136, and a generally right circumferential threaded surface 119 extending inwardly from the first retaining bore and terminating at the first annular ledge 128, both centered about the centerline 144 of the stepped bore

116, and the first annular ledge 128 extends radially inwardly of the stepped bore 116 therefrom along a plane normal to the centerline 144 and at the terminus of the circumferential threaded surface 119 distal to the first annular end face 136 of the housing 102. As will be described herein, first annular ledge 128 limits the penetration depth of the first body 104 inwardly of the first end 110 of the housing 102.

A sleeve bore 120 extends from the inner radial end of the first annular ledge 128 and further inwardly of the stepped bore 116 therefrom, and terminates at an annular sleeve ledge 130. Sleeve bore 120 has a generally right circumferential sleeve bore surface 121 centered about the centerline 144 of the stepped bore 116, and the annular sleeve ledge 130 extends radially inwardly of the stepped bore 116 therefrom along a plane normal to the centerline 144 and at the terminus of the sleeve bore 120 distal to the first annular end face 136 of the housing 102. Thus, the inner diameter and inner circumference of the sleeve bore 120 are smaller than the inner diameter and inner circumference of the first body receiving bore 118.

Flow bore 122 extends inwardly of the housing 102 from the radial inward terminus of the annular sleeve ledge 130 toward the outlet at the second end 112 of the housing 102 and includes a generally right cylindrical flow bore surface 123 centered about the centerline 144. Flow bore surface 123 and flow bore 122 extend from the first annular ledge 128 to an annular pedestal ledge 132 extending radially outwardly from the terminus of the flow bore surface 123 distal to the first annular end face 136. A pedestal bore 124, having a cylindrical pedestal bore surface 125 centered about centerline 144, extends from the annular pedestal ledge 132 in the direction away from first annular end face 136 to an outlet bore annular limit ledge 134. Annular limit ledge 134 extends radially outwardly from the pedestal bore surface 125 along a plane normal to the centerline 144, and terminates at a threaded outlet bore surface 127 bounding an outlet bore 126 extending from the annular limit ledge 134 to a second retaining bore surface 229. Circumferential second retaining bore surface 229 extends from the threaded outlet bore surface 127 to the second annular end face 138 of the housing 102 generally centered about the centerline 144.

At the first end 110 of the housing 102, and inwardly of first annular end face 136 thereof, a plurality, for example four (three shown in FIG. 2), first end threaded set screw bores 139 extend from outer cylindrical surface 114 to penetrate the first retaining bore surface 117 (between the circumferential threaded surface 119 and the first annular end face 136). At the outlet at the second end 112 of the housing 102 and inwardly of the second annular end face 138 thereof, a plurality, for example four (three shown in FIG. 2), second end threaded set screw bores 140 extend from outer cylindrical surface 114 to penetrate the second retaining bore surface 229 (between threaded outlet bore surface 127 and second annular end face 138 of the housing 102.

Figure 6:
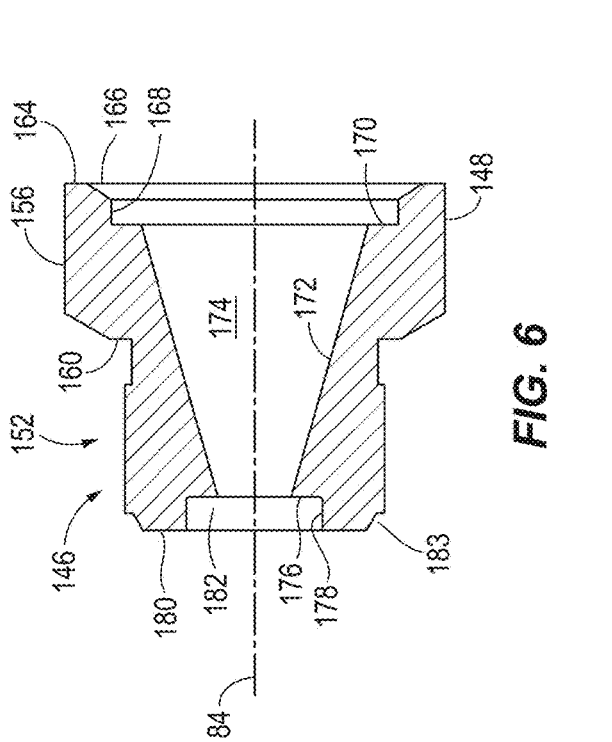
FIG. 6 is a sectional vies of the first body of FIG. 5.

As best shown in FIGS. 5 and 6, first body 104 includes an outer configured surface and an inner configured surface. Outer configured surface here includes a threaded housing connection hub 146, an equipment connection hub 148, and a fixing hub 150 located between first body first end wall 164 and inlet body second end wall 180. First body first end wall 164 is an annular wall extending in a plane normal to centerline 144 of the housing 102 when installed therein, and extending between the inner and outer configured surfaces of the first body 104. Inlet body second end wall 180 is an annular wall extending in a plane normal to centerline 144 of the housing 102 when installed therein, and extending between the inner configured surface of the first body 104 to a circumferential boss wall 181 extending from the outer circumferential terminus thereof and in the direction of the first annular end face 136 of the housing 102. A tapered frustoconical inlet body wall 183 extends from the terminus of the circumferential boss wall 181 distal to the inlet body second end wall 180 and extends to the housing connection hub 146. Housing connection hub 146 is configured as a right annular portion of the first body 104 and has an outer threaded housing connection surface 152 extending circumferentially thereabout and when received and threaded into the first body receiving bore 118 is centered about centerline 144. Equipment connection hub 148 is configured as a right annular portion of the first body 104 and has the connection hub threaded surface 156 extending circumferentially thereabout, and when the first body 104 is threaded into and received in the first body receiving bore 118, is centered about centerline 144 of housing 102. Equipment connection hub 148 is configured with threads on the connection hub threaded surface 156 to be connected to a high pressure flowline or another connector for high pressure equipment. Alternatively, equipment connection hub 148 can have an unthreaded outer surface which can be received within a flange or other connection to the high pressure line or other equipment connector. Fixing hub 150 includes an outer circumferential fixing surface 154 that, when the first body 104 is received in the housing 102 by threading the housing connection hub 146 into the first body receiving bore 118, is centered about centerline 144 of housing 102. Fixing surface 154 extends from the housing connection hub 146 to the equipment connection hub 148 and has a diameter smaller than that of outer threaded housing connection surface 152 and of connection hub threaded surface 156, such that opposed annular first and second fixing ledges 158, 160 are formed at opposed ends thereof. Once the first body 104 is threaded into the housing 102, a threaded rod shaped member such as a set screw 162 is received in the first end threaded set screw bores 139 (FIGS. 2 and 5) to extend therein and into engagement with the fixing surface 154 aligned under the first end threaded set screw bores 139 to provide a force to help prevent rotation of the first body 104 in the first body receiving bore 118.

Figure 7:
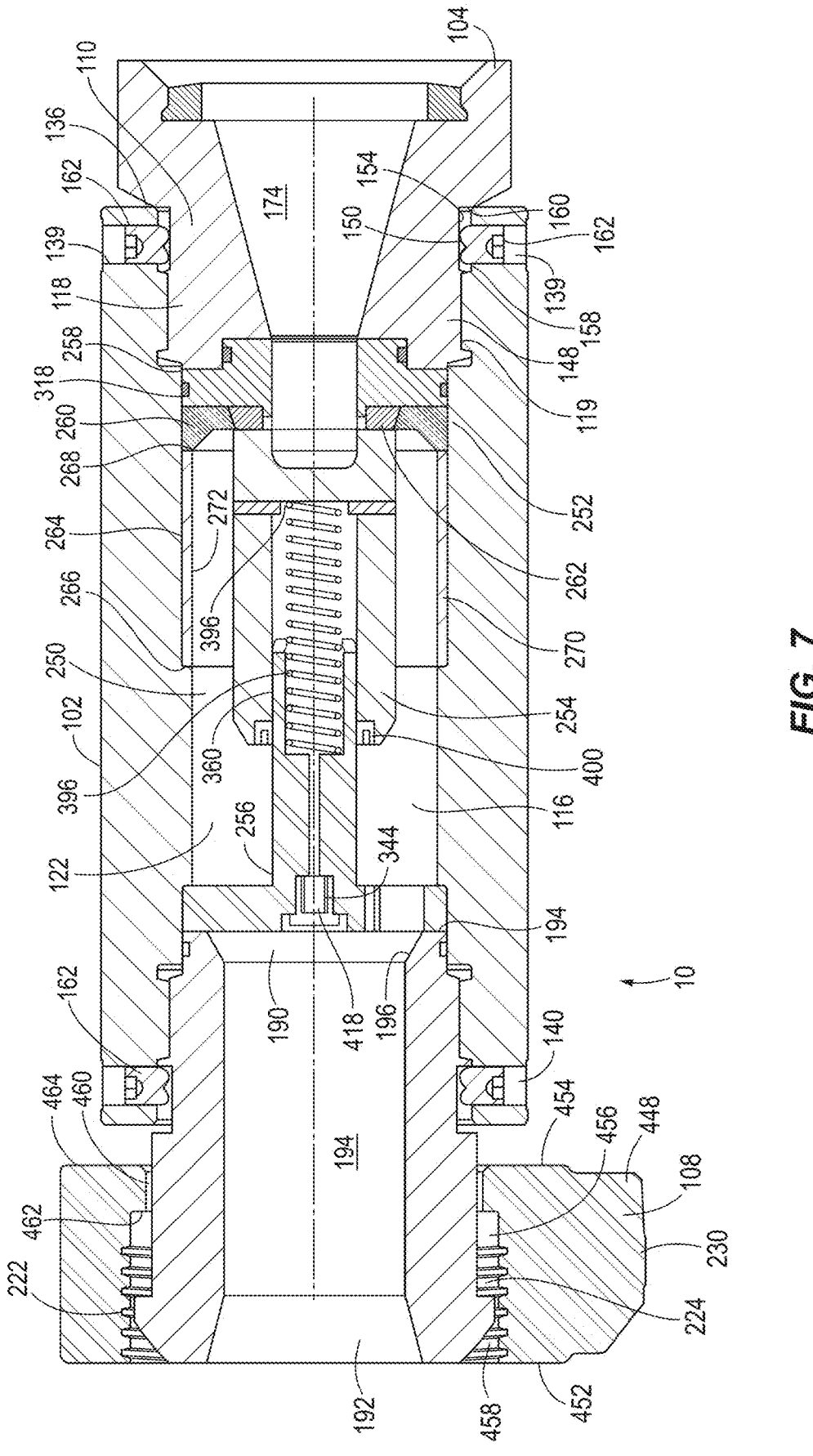
FIG. 7 is a sectional view of the valve of FIG. 1, showing the valve in the closed position.

Referring to FIGS. 6 and 7, the inner configured surface of the first body 104 includes an alignment bore 166 extending inwardly of an first body first end wall 164 thereof, that when the first body 104 is received in the housing 102, is located distal to the first annular end face 136 and outwardly of the stepped bore 116 of the housing 102. Alignment bore 166 is configured as a frustoconical surface and terminates inwardly of the first body first end wall 164 at a circumferential anti-extrusion ring wall 168, which terminates inwardly of the first body 104 at an annular anti-extrusion ring ledge 170. Alignment bore 166, anti-extrusion ring wall 168 and annular anti-extrusion ring ledge 170 extend circumferentially about and are centered on the first body centerline 184, which will align generally parallel and collinearly to the centerline 144 of housing 102 when the first body 104 is received in housing 102. An inwardly tapered first body flow bore wall 172 defining a first body flow bore 174 which provides the inlet flow bore to the valve 10 extends inwardly of the first body 104 from the radially inner end of the annular anti-extrusion ring ledge 170 to a retaining ring alignment bore 182 extending inwardly of an inlet body second end wall 180. The diameter and circumference of the first body flow bore 174 and first body flow bore wall 172 linearly decreases in the direction from the end of the first body 104 coupled to the equipment or flow line to be protected from an overpressure condition therein by the valve 10 in the direction of the housing 102. Thus, during a valve operation where fluid can flow through the valve 10, the first body flow bore 174 provides a funnel having a reduced cross section in the direction of fluid flow from the equipment or line being protected toward the valve 10 outlet.

First body flow bore wall 172, and thus inlet body flow bore 174, extends circumferentially about and is centered on the first body centerline 184. Retaining ring alignment bore 182 includes an annular retaining ring alignment bore ledge 176 extending radially outwardly of the end of the first body flow bore wall 172 at its end distal to first body first end wall 164, and retaining ring alignment bore ledge 176 terminates at a circumferential retaining ring bore wall 178. Retaining ring bore wall 178 extends from the outer circumferential terminus of the retaining ring alignment bore ledge 176, and to the inlet body second end wall 180, circumferentially about and is centered on the first body centerline 184.

The first body 104 is connected to the housing 102 by inserting the threaded housing connection hub 146 inwardly of the circumferential threaded surface 119 surrounding the first body receiving bore 118, and rotating one or both of the housing 102 and first body 104 to thread the threaded housing connection hub 146 into the first body receiving bore 118, Contact of the second fixing ledge 160 with the second end wall 180 of the housing 102 limits the depth of penetration of the equipment connection hub 148 inwardly of the housing 102, and also locates the fixing hub 150 in alignment with the first end threaded set screw bores 139 such that set screws 162 can be threaded into the first end threaded set screw bores 139 such that one end thereof contacts the outer circumferential fixing surface 154 of the fixing hub 150. If the first body 104 begins to back out of the housing 102, the flanks of the set screws 162 will engage the first fixing ledge 158, formed of the flanks of the threads on the housing connection hub 146, to prevent further withdrawal of the first body 104 from the housing 102.

Figure 8:
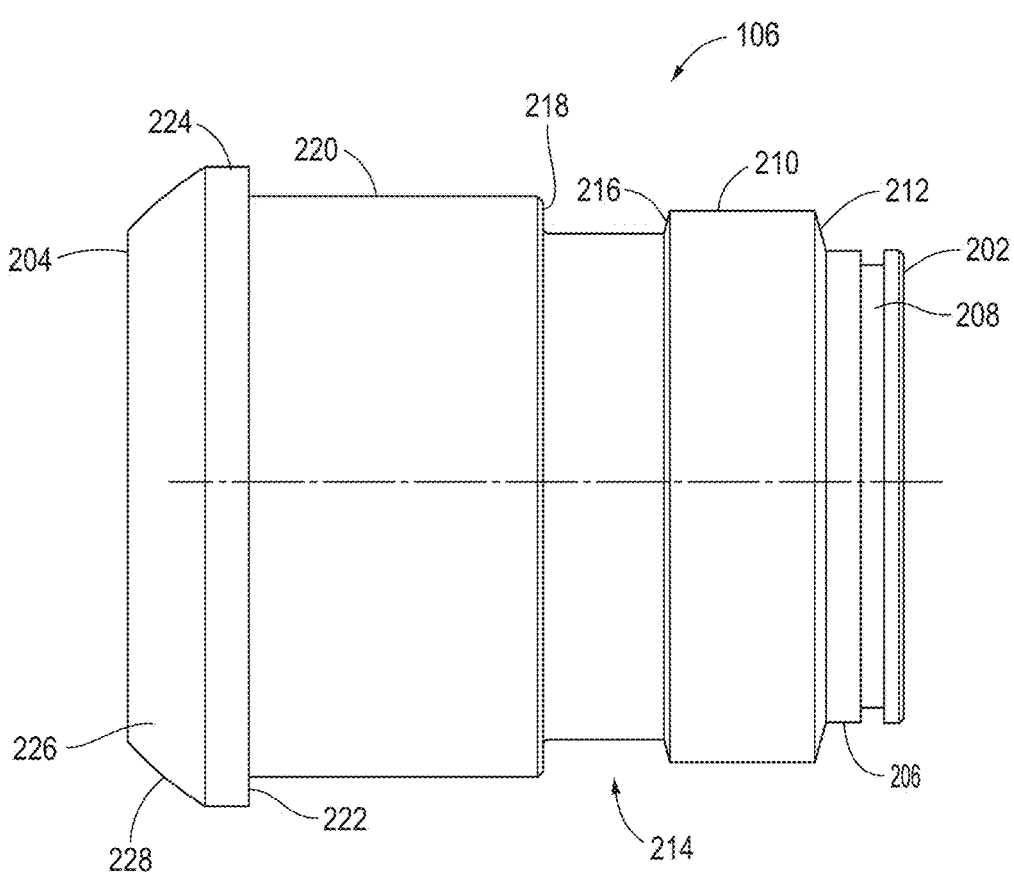
FIG. 8 is a side view of the second body of FIG. 1.
Figure 9:
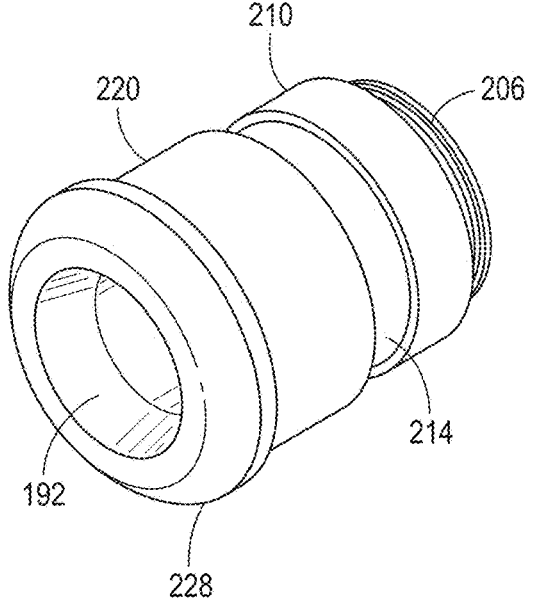
FIG. 9 is an isometric view of the second body of FIG. 1.
Figure 10:
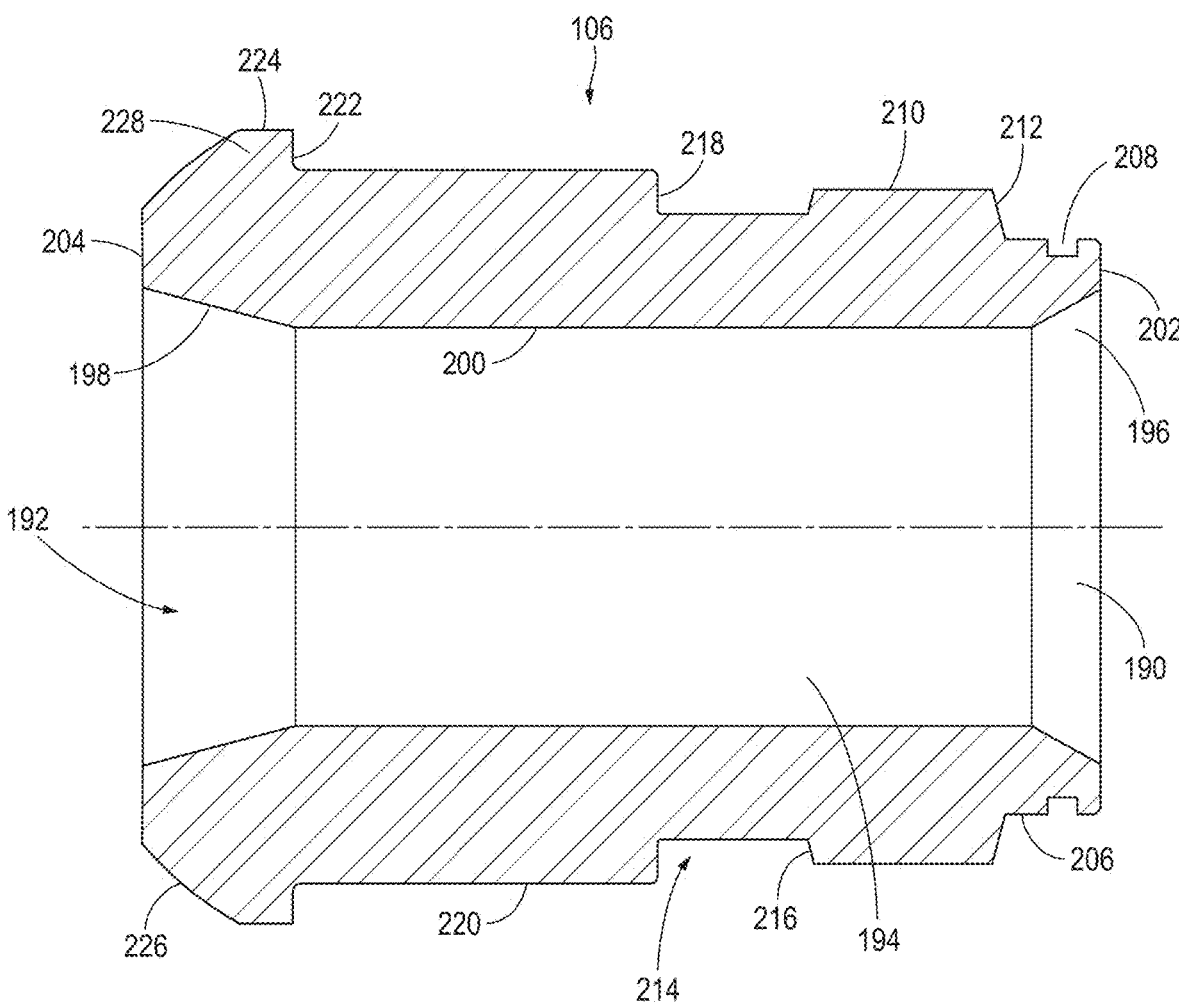
FIG. 10 is a sectional view of the second body of FIG. 1.

Referring to FIGS. 8 to 10, the details of the second body 106 are shown. Here, second body 106 is a generally cylindrical annular body having a contoured outer surface and a contoured inner surface. As shown in FIG. 10, the contoured inner surface includes an outlet side tapered inlet bore 190, an outlet side tapered outlet bore 192, and an outlet through bore 194 extending therebetween. Here a frustoconical outwardly facing tapered inlet surface 196 extends inwardly of the outlet body first annular end face 202 and surrounds the outlet side tapered inlet bore 190, and a frustoconical outwardly facing tapered outlet surface 198 extends inwardly of the outlet body second annular end face 204 and surrounds the outlet side tapered outlet bore 192. Outlet through bore 194 is a right cylindrical bore having an inner through bore surface 200 of a constant diameter over its length. The second body inner through bore surface 200 extends from the inward terminus of the frustoconical outwardly tapered inlet surface 196 distal to the outlet body first annular end face 202 to the inward terminus of the frustoconical outwardly tapered outlet surface 198 distal to the outlet body annular second end face 204.

The outer contoured surface of the second body 106 includes a circumferential sealing hub surface 206 extending from the outlet body first annular end face 202 and terminating at a first tapered outer surface 212 extending radially outwardly of the circumferential sealing hub surface 206 and in the direction of the outlet body second annular end face 204. An outlet hub seal recess 208 extends inwardly of the circumferential sealing hub surface 206 and circumferentially around the circumferential sealing hub surface 206. A threaded attachment surface 210, which is a circumferential threaded surface, extends from the terminus of the first tapered outer surface 212 distal of the outlet body first annular end face 202 to a second securement receiving surface 214. The flanks of the threads of the threaded attachment surface 210 adjacent to the second securement receiving surface 214 form a second body first limit wall 216. The second securement receiving surface 214 extends from the second body first limit wall 216 of the threaded attachment surface 210 in the direction of the outlet body second annular end face 204 and terminates at an outwardly extending second body second limit wall 218. A second pilot surface 220 which is a circumferential cylindrical surface extends from the end of the second body second limit wall 218 in the direction of the outlet body second annular end face 204, to an annular, outwardly projecting, flange ledge surface 222. From the outer terminus of the flange ledge surface 222 a circumferential lock nut alignment surface 224 extends toward the outlet body second annular end face 204, from which an outlet end tapered surface 226 extends to the outlet body second annular end face 204. The flange ledge surface 222, circumferential lock nut alignment surface 224 and a portion of the outlet end tapered surface 226 together define a locking flange 228 for securement of the outlet body to an outlet conduit (not shown) by use of a lock nut 230 in the form of, for example, a wing nut (FIGS. 1 and 5). Second body 106 is secured in housing 102 by inserting the circumferential sealing hub surface 206, with a seal such as an O-ring in the outlet hub seal recess 208, inwardly of the second end 112 of the housing 102 until the leading edge of the threads on the threaded attachment surface 210 contacts the threads second threaded outlet bore surface 127. Thence, one or both of the housing 102 and second body 106 are rotated to thread the threaded attachment surface 210 into the threaded outlet bore surface 127 until the second securement receiving surface 214 underlies the second end threaded set screw bores 140. At this point threaded rod shaped member such as a set screw 162 (FIG. 7) is received in the second end threaded set screw bores 140 and against the second securement receiving surface 214 to secure the second body 106 against rotation with respect to the housing 102.

Figure 11:
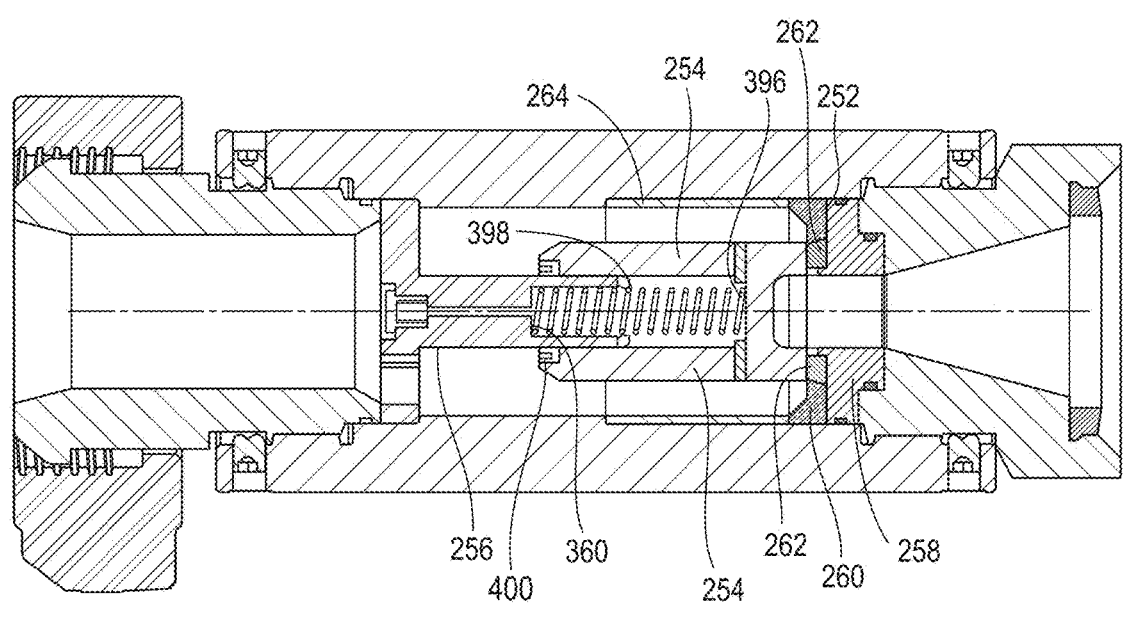
FIG. 11 is a sectional view of the valve of FIG. 1 in the closed position, with the poppet thereof engaged against the seat ring of the seat assembly thereof.
Figure 12:
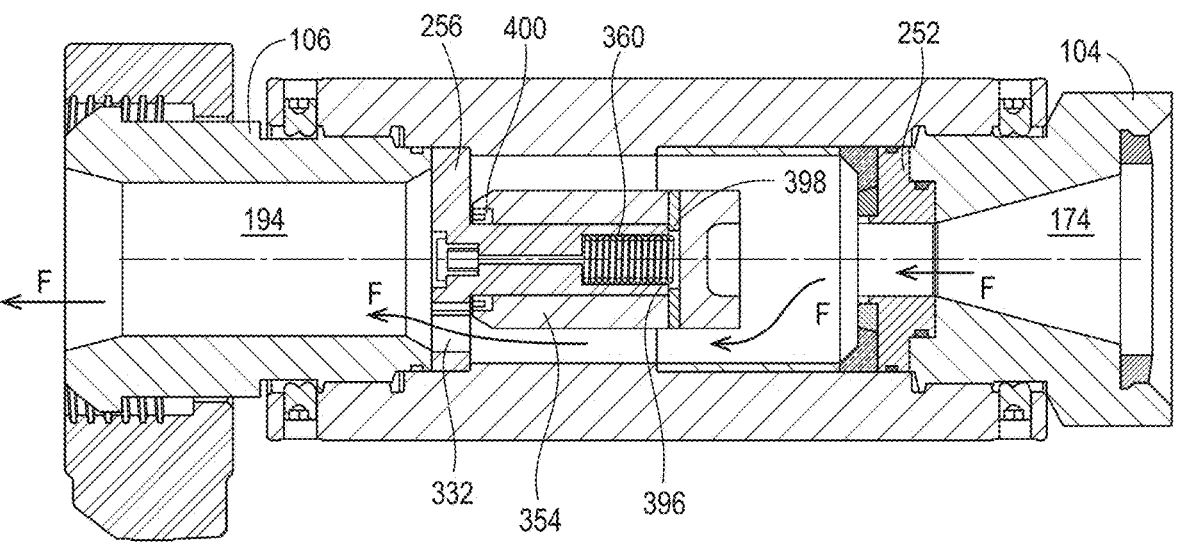
FIG. 12 is a sectional view of the valve of FIG. 1 in the open position, with the poppet thereof in its fully retracted position and spaced its greatest possible distance from the seat ring of the seat assembly thereof.

As shown in FIG. 7, within the stepped bore 116 of the housing 102 and between the first body 104 and the second body 106 the valve functional elements 250 are located. These valve functional elements 250 include a seat assembly 252, a poppet 254 and a pedestal 256 on which the poppet 254 is piloted and along which the poppet 254 can move from a seat assembly 252 engagement position wherein the valve 10 is in a closed position as shown in FIG. 11, and a retracted from the seat assembly 252 position wherein the valve 10 is open as shown in FIG. 12 to allow fluid to flow through the first body 104, the housing 102, and through and outwardly of the outlet flow bore 194 second body 106 to alleviate an overpressure condition present at the first body flow bore 174 of the first body 104.

In the aspect of the valve 10 shown, the seat assembly 252 is composed of a first retaining ring 258, a second retaining ring 260, and a conformable seat ring 262. A sleeve 264 in the form of an annular tubular member having a first annular sleeve end wall 266, and a second annular sleeve end wall 268 spaced from one another by an outer cylindrical sleeve surface 270 and an inner cylindrical sleeve surface 272, is located in the sleeve bore 120. Sleeve 264 here is used to set the location of the second retaining ring 260 within the stepped bore 116. As the first retaining ring 258 abuts the second retaining ring 260, the position of the second retaining ring 260 sets the location of the first retaining ring 258 with respect to the stepped bore 116, which in turn sets the location of the seat ring 262 contacting surfaces of both the first and second retaining rings 258, 260 within the stepped bore 116 of the housing 102. Sleeve 264 also protects the inner surface of the right cylindrical sleeve bore surface 121 of the stepped bore 116 in that it covers that surface to protect it from erosion caused by high velocity abrasive laden fluid flowing therethrough. Alternatively, the sleeve 264 can be eliminated and a fixing ledge for locating of the seat assembly 252 within the stepped bore 116 can be provided. Here first annular sleeve end wall 266 contacts the annular sleeve ledge 130, fixing the location of the second annular sleeve end wall 268 in stepped bore 116. The diameter and circumference of the outer cylindrical sleeve surface 270 is slightly smaller than that of the sleeve bore surface 121. The diameter and circumference of the inner cylindrical sleeve surface 272 is selected to match or nearly match that of the flow bore 122 so as to not impede flow through the housing 102 when the valve 10 is in an open position, but not form a raised circumferential ledge of the annular sleeve ledge 130 extending radially inwardly of the inner cylindrical sleeve surface 272.

Figures 13, 14:
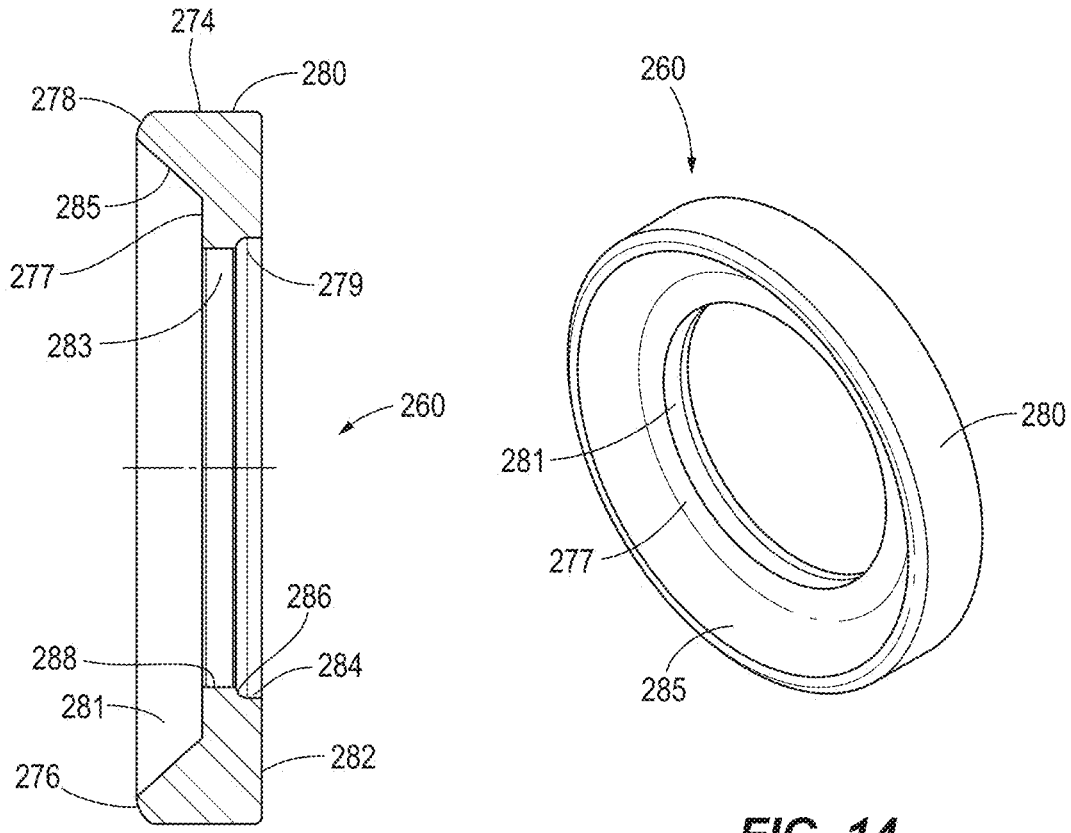
FIG. 13 is a sectional view of a second retaining ring of the seat assembly of the valve.
FIG. 14 is an isometric view of the second retaining ring of FIG. 13.

Referring to FIGS. 13 and 14, the second retaining ring 260 is an annular member having an outer circumferential surface 280 composed of an outer circumferential ring wall 274, an annular sleeve facing wall 276, an outer annular tapered wall 278 extending between the outer circumferential ring wall 274 and the annular sleeve facing wall 276, and an annular first retaining ring facing wall 282 extending inwardly and from the outer circumferential ring wall 274 on the side thereof opposite to the annular sleeve facing wall 276. A seat retaining recess 279 is located at the radially inward terminus of the first retaining ring facing wall 282, and a circumferential recess wall 284 extends in the direction away from the first retaining ring facing wall 282 generally perpendicular to the surface of the first retaining ring facing wall 282, and circumferentially bounds the seat retaining recess 279. Seat retaining recess 279 is configured to receive a portion of the seat ring 262 therein and includes the circumferential recess wall 284 extending inwardly of the second retaining ring 260 from the radially inner end of the first retaining ring facing wall 282, and an annular seat limit wall 286 extending radially inwardly from the seat facing circumferential recess wall 284. A radiused blend wall extends therebetween. A circumferential seat facing wall 288 extends in the direction away from the first retaining ring facing wall 282, at the radially inner end of the annular seat limit wall 286, to bound a seat recess 283. A contoured wall 281 extends between the side of the seat facing circumferential recess wall 284 distal to the seat retaining recess 279 and the annular sleeve facing wall 276. Contoured wall 281 includes an annular poppet facing wall 277 extending radially outwardly from the end of the circumferential seat facing wall 288 distal to the first retaining ring facing wall 282, and a tapered frustoconical poppet facing wall 285 extending from the radially outer end of the annular poppet facing wall 277 to the annular sleeve facing wall 276. Upon assembly into the housing 102, the annular sleeve facing wall 276 of the second retaining ring 260 is engaged against the second annular sleeve end wall 268 of the sleeve 264, and the first retaining ring facing wall 282 of the second retaining ring 260 faces and contacts the first retaining ring 258.

Referring to FIGS. 15, 16*a* and 16*b*, details of the first retaining ring 258 are shown. Here, first retaining ring 258 is a right annular body having a right annular main body 289 on opposed side of which a right cylindrical pilot boss 290 and a right cylindrical seat assembly boss 292 project. Main body 289 includes an outer circumferential surface 294 sized to be received within the sleeve bore 120, the outer circumferential surface 294 including a sleeve bore seal recess 296 extending circumferentially therein, into which a seal ring such as an O-ring is disposed to seal the region between the outer circumferential surface 294 and the facing inner surface of the sleeve bore 120 when the first retaining ring 258 is located within the sleeve bore 120 of the housing 102. An annular second retaining ring engaging surface 298 extends radially inwardly of the outer circumferential surface 294 and terminates at the seat assembly boss 292. A seal expansion recess 300, in the shape of a V in a cross section thereof along a radius of the second retaining ring engaging surface 298, and extends inwardly of and circumferentially about the second retaining ring engaging surface 298 at a location slightly radially outwardly of the seat assembly boss 292. An annular first body facing surface 316 extends radially inwardly from the outer circumferential surface 294 on the side of the main body 289 opposite thereof from the second retaining ring engaging surface 298, and it terminates at the pilot boss 290.

Figure 19:
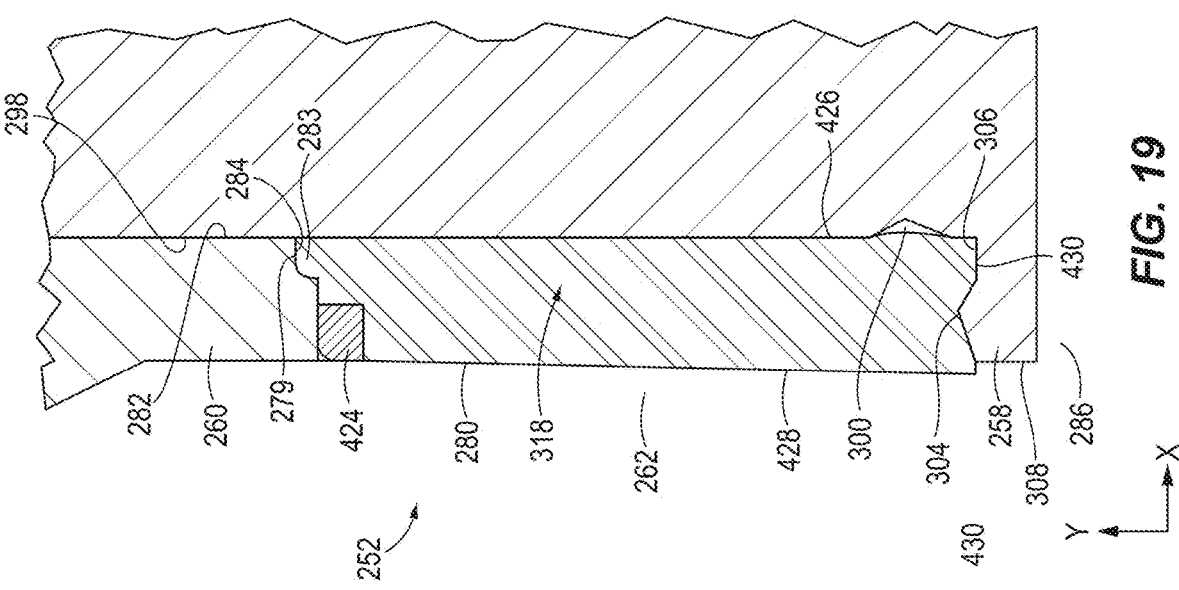
FIG. 19 is a partial sectional view of the seat assembly, showing the connection of the seat ring to the first and second retaining rings.

Seat assembly boss 292 includes a circumferential seat support wall 306 extending outwardly from the radial inward terminus of the of second retaining ring engaging surface 298 that terminates in an annular seat assembly boss end wall 308. A seat retaining protrusion 304, which is V shaped in cross section as referenced in the direction between the second retaining ring engaging surface 298 and the annular seat assembly boss end wall 308, extends radially outwardly of, and circumferentially around, the circumferential seat support wall 306. When the seat ring 262 is located over the circumferential seat support wall 306, the seat retaining protrusion 304 extends inwardly of the seat ring 262 to help limit movement thereof within the seat assembly 252. A central first retaining ring bore 310 extends through the first retaining ring 258, from the radial inner end of the annular seat assembly boss end wall 308 to an annular pilot face 312 (annular wall) of the pilot boss 290. As shown in FIG. 19, the second retaining ring engaging surface 298 faces, and contacts, the first retaining ring facing wall 282 of the second retaining ring 260 when the first and second retaining rings 258, 260 are disposed in the housing 102, and together form a seat retaining volume 318 formed between a portion of the second retaining ring engaging surface 298 and a portion of the annular seat limit wall 286 to secure the seat ring in the seat assembly 252.

Pilot boss 290 is configured to be received in the retaining ring alignment bore 182 of the first body 104, and includes a pilot outer cylindrical surface 314 extending circumferentially about the pilot boss 290 from the annular pilot face 312 to the first body facing surface 316. A pilot seal groove 302 extends inwardly of the pilot boss 290 inwardly of, and circumferentially around, the pilot outer cylindrical surface 314. Upon assembly into the valve 10, the pilot boss 290 extends inwardly of the retaining ring alignment bore 182 of the first body 104, and a seal ring is disposed in the pilot seal groove 302 to seal the interface between the retaining ring bore wall 178 and the pilot outer cylindrical surface 314. The depth of penetration of the pilot boss 290 inwardly of the retaining ring alignment bore 182 is limited by the engagement of the annular pilot face 312 with the inlet body second end wall 180.

Figure 17:
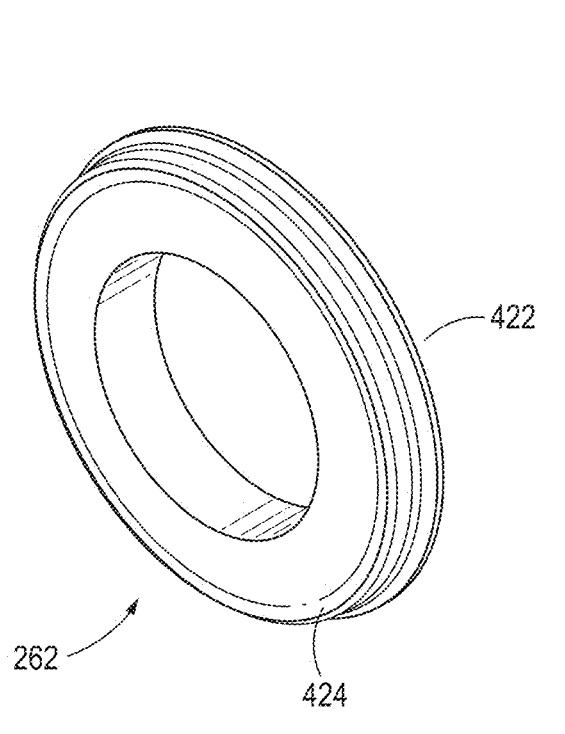
FIG. 17 is an isometric view of the seat ring of the seat assembly.
Figure 18:
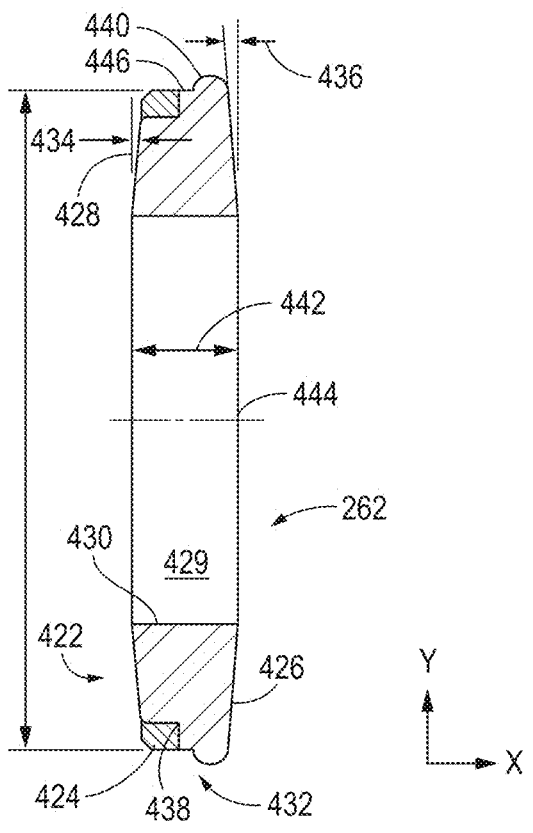
FIG. 18 is a sectional view of the seat ring of FIG. 17.

Referring to FIGS. 17 and 18, the construct of the seat ring 262 is shown. Seat ring 262 is a generally annular member having an annular conformable body 422 and an annular anti-extrusion ring 424 directly coupled thereto, for example by molding the conformable body 422 in a mold containing the anti-extrusion ring 424 therein (insert molding) to affix the anti-extrusion ring 424 to the conformable body 422. Conformable body 422 includes a first outer annular tapered wall surface 426 and a second annular tapered wall surface 428 on the opposed side thereof from the first outer annular tapered wall surface 426, and they circumferentially surround the opposed ends of a seat through passage 429. A generally right cylindrical inner body wall 430 extends between the inner radial ends of the first outer annular tapered wall surface 426 and the second annular tapered wall surface 428, and has an inner wall width dimension 442 between the first outer annular tapered wall surface 426 and the second annular tapered wall surface 428.

An outer configured wall surface 432 extends between the radially outer ends of the first outer annular tapered wall surface 426 and the second annular tapered wall surface 428. Outer configured surface includes a ring notch 438 extending inwardly of the outer radial end of the second annular tapered wall surface 428 within which the anti-extrusion ring 424 is secured, a circumferential spacing wall 446 extending from the radially outer end thereof, and a circumferential rounded protrusion 440 extending radially outwardly from the circumferential end of the circumferential spacing wall 446 distal to the ring notch 438 and between the circumferential spacing wall 446 and the radially outer end of the first outer annular tapered wall surface 426. The anti-extrusion ring 424 contacts the surfaces of the ring notch 438, such that the circumferential rounded protrusion 440 is located adjacent thereto and extends radially outwardly beyond the radial outer side of the anti-extrusion ring 424.

The first outer annular tapered wall surface 426 and the second annular tapered wall surface 428 of the conformable body 422 taper inwardly in the X-direction as they extend radially outwardly from the seat through passage 429, such that the width of the annular conformable body in the X-direction of FIG. 18 decreases along the Y-direction of FIG. 18 in the direction away from the cylindrical inner body wall 430. A first angle 436 between the first outer annular tapered wall surface 426 and a ray extending perpendicular to the seat assembly centerline 444, and a second angle 434 between the second annular tapered wall surface 428 a ray extending perpendicular to the seat assembly centerline 444 is greater than 0 degrees, and preferably less than 10 degrees, for example 4 to 6 degrees.

To assemble the seat assembly 252 as shown in FIGS. 7 and 19, cylindrical inner body wall 430 of the seat ring 262 is located over the circumferential seat support wall 306 of the first retaining ring 258, such that the seat retaining protrusion 304 biases inwardly of the cylindrical inner body wall 430 to help retain the seat ring 262 on the first retaining ring 258 during the assembly of the seat assembly 252 as shown in FIG. 19. The second retaining ring facing surface 298 of the first retaining ring 258 is then pressed against the first retaining ring facing surface 282 of the second retaining ring 260, with the seat ring 262 secured in the seat retaining volume 318 formed therebetween. The seat ring 262 is oriented such that the circumferential rounded protrusion 440 extends inwardly of the seat retaining recess 279 of the second retaining ring 260, to hold and retain the seat ring 262 within the seat assembly 252. As shown in FIG. 19, here the seat ring 262 is configured such that the second annular tapered wall surface 428 extends laterally outwardly of, in the X-direction of FIG. 19, the annular seat assembly boss end wall 308 at the cylindrical inner body wall 430 thereof, as the width of the seat ring 262 at the cylindrical inner body wall 430 thereof (in the x-direction) is greater than the distance from the annular seat assembly boss end wall 308 to the second retaining ring facing surface 298 of the first retaining ring 258 in the x-direction. When the first annular poppet end face 366 of the poppet 254 (FIG. 22) is pressed against seat ring 262 to maintain the valve in the closed to position to prevent fluid flow therethrough, the first outer annular tapered wall surface 426 overlying the seal expansion recess 300 can be pushed inwardly thereof.

Figures 20, 21, 23, 24:
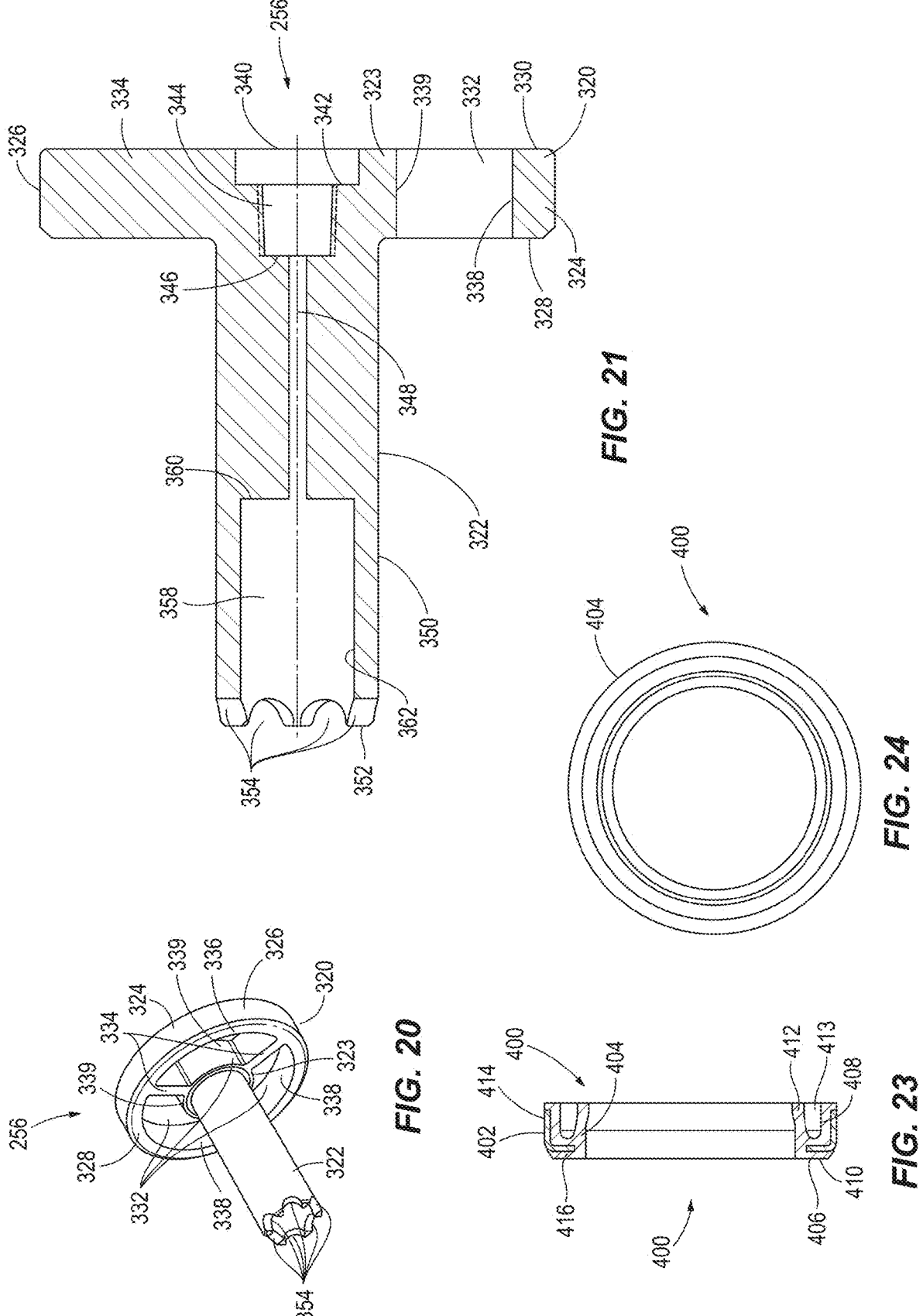
FIG. 20 is an isometric view of the pedestal on which the poppet is reciprocatably supported.
FIG. 21 is a sectional view of the pedestal of FIG. 20.
FIG. 23 is a sectional view of a wiper.
FIG. 24 is a front view of the wiper of FIG. 23.

Referring to FIGS. 7, 20 and 21, the pedestal 256 is configured to be received in the pedestal bore 124 of the housing 102 and hold and guide the poppet 254 within the housing 102. Here, pedestal 256 includes a base 320 is the shape of a spoked wheel, and a support tube 322 extending from the central hub 323 of the base 320 at the circumferential or diametric center of base 320. Base 320 here includes an outer ring body 324 having a pedestal base outer circumferential surface 326, opposed first and second annular end walls 328, 330 extending inwardly from opposed ends of the pedestal base outer circumferential surface 326, and a plurality of segmented inwardly facing ring walls 338, each extending partially circumferentially along a radius centered at the center of the ring body 324. A plurality of spokes 334 extend from between adjacent ends of adjacent ones of the inwardly facing ring walls 338 to the hub 323, here three spokes 334, separate the inner region of the ring body 324 into three arcuate openings 332 equally spaced about the center of the ring body 324. Each arcuate opening 332 is bounded by an inwardly facing ring wall 338, the facing sides of the adjacent spokes 334, and a hub outer segment wall 339 extending in an arc centered on the center of the ring body 324. The arcuate openings 332 enable fluid communication through the base 320, and thus flow therethrough from the valve inlet to the valve outlet when the poppet 254 is backed away from the seat assembly 252.

A central counterbore 340 extends inwardly of the second annular end wall 330, and terminates inwardly thereof at an annular vent plug limit wall 342 within the central hub 323. A threaded vent plug bore 344 extends further inwardly of the hub 323 and slightly inwardly of the portion of the support tube 322 where it ends in an annular vent wall 346.

Support tube 322 extends from the center of the hub 323 and further includes an outer circumferential guide surface 350, and a central vent passage 348 extending from the center of the annular vent wall 346 inwardly of the support tube 322 where it opens into a spring recess 358 extending inwardly of the annular end face 352 of the support tube 322 facing away from the second annular end wall 330 of the ring body 324. Central vent passage 348 allows fluid communication between the vent plug bore 344 and the spring recess 358. Spring recess 358 includes an annular spring support wall 360 surrounding the opening of the central vent passage 348 into the spring recess 358, and a spring guide wall 362 extending from the radial outer side of the spring support wall 360 to the annular end face 352. Annular end face 352 is configured as a circumferential surface having an even plurality of, here six, rounded detents 354 equally spaced from one another about the circumference of the annular end face 352.

Figure 22:
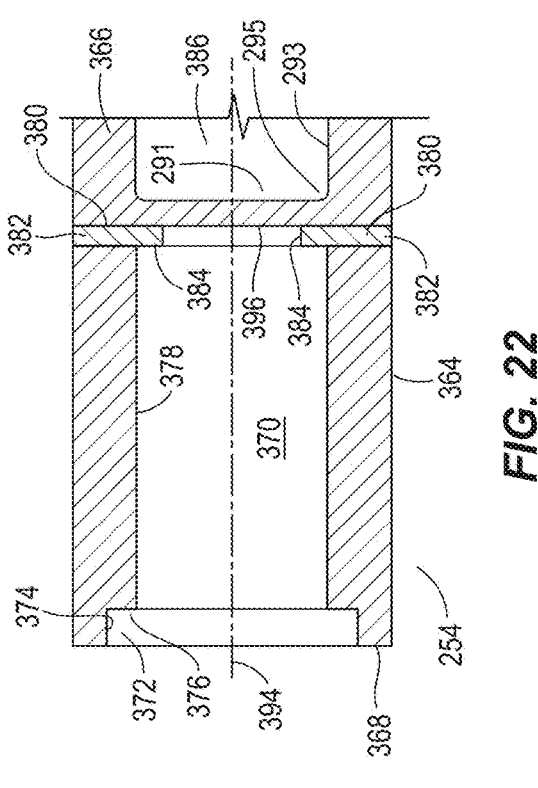
FIG. 22 is a sectional view of the valve poppet.

As shown in FIGS. 11 and 12, poppet 254 is configured to be received over, and reciprocate along, the support tube 322 between a valve open position (FIG. 12) and a valve closed position (FIG. 11). As shown in FIG. 22, poppet 254 is generally annular in profile, and includes a cylindrical circumferential outer poppet surface 364 bounded by a first annular poppet end face 366 forming a seal surface for engagement with the seat assembly of the valve 10, and a second annular end face 368 facing away from first annular poppet end face 366 at the opposed end of the poppet 254. An annular wiper counterbore 372 extends inwardly of the second annular end face 368 generally centered about poppet centerline 394, and a pedestal alignment bore 370 extends further inwardly of the second annular end face 368 from the inner terminus of the wiper counterbore 372. Wiper counterbore includes a circumferentially extending wiper counterbore side wall 374 extending inwardly of the poppet 254 from the second annular end face 368, and an annular wiper support ledge 376 extending radially inwardly from the inner terminus of the sidewall of the wiper counterbore 372. The pedestal alignment bore 370 extends, centered about poppet centerline 394, inwardly of the poppet 254 from the radial inner terminus of the wiper support ledge 376 and terminates at a generally circular alignment bore base wall 396. An even plurality of pin bores 380 (two shown) are disposed in an equally spaced apart relationship about the circumference of the alignment bore and each pin bore extends along a radius centered on the poppet centerline 394. At least two, and up to an equal number as the number of detents 354 in the annular end face 352 of the support tube 322, alignment pin bores 380 are provided. A support pin 382 is located in at least one of the pin bores 380, and end 384 thereof extends inwardly into the pedestal alignment bore 370 from the inner circumferential wall 378 of the alignment bore adjacent to the alignment bore base wall 396. The circumferential spacing between the pins bores 380 is set to ensure that each pin end 384 is centered in one of the detents 354 when the annular end face 352 of the pedestal 256 is pushed to, or adjacent to, the alignment bore base wall 396 of the poppet 254. Each of the pin ends 384 will thus become received in one of the detents 354 in the poppet 254, to circumferentially reset the rotational orientation of the poppet 254 on the pedestal 256, and thus prevent or substantially reduce the incidence of rotation of the poppet 254 about the support tube 322.

The seat assembly facing side of the poppet 254 includes a stagnation bore 386 extending thereinto, bounded by an inner circumferential stagnation bore wall 293 and a generally circular, in plan view, stagnation bore base wall 291, connected by a radial blend wall 295.

As shown in FIGS. 11 and 12, a poppet spring 398 extends between the alignment bore base wall 396 and the annular spring support wall 360 of the pedestal 256 The poppet spring 398 supplies a spring force biasing the first annular poppet end face 366 against the second annular tapered wall surface 428 in the seat ring 262 of the seat assembly 252 under normal pressure conditions being present in the first body flow bore 174 of the first body 104 connected to a fluid circuit for which the valve 10 provides overpressure protection. The diameter of the inner circumferential wall 378 of the poppet 254 is on the order of 0.010 to 0.020 inches greater than the outer diameter of the support tube 322, and thus the poppet 254 can reciprocate along the length direction of the support tube 322 without binding. When an overpressure condition is present at the first body flow bore 174 at a pressure sufficient to impose a force on the stagnation bore base wall 291 sufficient to overcome the force of the poppet spring 398 keeping the first annular poppet end face 366 of the poppet 254 biased against the second annular tapered wall surface 428 of the seat ring 262, the poppet 254 will move in the direction of the base 320 of the pedestal 256 as shown in FIG. 12, allowing fluid in the first body flow bore 174 of the first body 104 to flow through the first retaining ring bore 310 and thence through an annulus formed between the first annular poppet end face 366 and the second annular tapered wall surface 428 of the seat ring 262 as the first annular poppet end face 366 of the poppet 254 backs off of the second annular tapered wall surface 428 of the seat ring 262. The fluid then flows across the annular poppet facing wall 277 of the second retaining ring where it is directed partially in the direction of the second body 106 to be redirected by the frustoconical poppet facing wall to flow though annular space between the poppet 254 and the sleeve 264, thence through the flow bore 122, and through the arcuate openings 332 in the pedestal 256 to the outlet in the second body 106 as shown by arrows F in FIG. 12. The stagnation bore 386 is exposed to the fluid in the inlet bore in the valve closed position of FIG. 11, this fluid forms a fluid barrier against entry of the high pressure fluid flowing from the first body flow bore 174 as the poppet 254 backs off of the seat ring 262, to prevent high velocity impact of abrasives in the abrasive laden high pressure flowing fluid against the interior flow surfaces of the valve 10, and thus reduces the wear on the poppet 254, including on the first annular poppet end face 366.

As the overpressure condition in the equipment or line being protected drops as a result of the flow of the fluid through the valve 10, the force of the high pressure fluid pushing against the first body 104 facing surfaces of the poppet will come into equilibrium with the force of the poppet spring 398 urging the poppet 254 in the direction of the seat ring 262 of the seat assembly 252. As the pressure in this high pressure fluid falls or drops to a lower pressure, the poppet spring 398 pushes the poppet 254 toward the seat ring 262, to contact the first annular poppet end face 366 against the second annular tapered wall surface 428 of the seat ring 262 to close the annulus therebetween and cause a seal therebetween, and thus moves the valve 10 into the closed position as shown in FIGS. 7 and 11. The pressure of the overpressure condition in the protected equipment dictates the extent to which the poppet 254 moves from the valve closed position of FIGS. 7 and 11 in the direction of the fully retracted position of the poppet 254 shown in FIG. 12.

Valve 10 has utility in high pressure applications, such as fracing, where the fluid under pressure is used to fracture subsurface formations, and includes solids therein which can abrade or erode the valve components, or become lodged in small spaces, such as between the poppet 254 and the circumferential guide surface 350 of the pedestal support tube 322. If solids become lodged in this space, they can cause the poppet 254 to be jammed against further motion, or create an excessive force condition where the valve will not open at its rated opening pressure. Here, to ameliorate this, a tube wiper 400 is secured in the wiper counterbore 372 of the poppet 254 as shown in FIGS. 7, 11 and 12. The wiper 400 circumferentially contacts the circumferential guide surface 350 of the pedestal support tube 322, and is secured to the poppet 254 to reciprocate therewith and help prevent the high-pressure abrasive laden fluid from entering the annular region between the outer circumferential guide surface 350 of the pedestal support tube 322 and the inner circumferential wall 378 of the poppet 254.

The wiper 400 is shown in further detail in FIGS. 23 and 24, and here is configured as a ring shaped lip seal having an elastic portion 404 connected to a solid backing ring 402. Here, elastic portion 404 is "U" shaped in section, and includes an annular base 410 from which projects a ring connection portion 408 and a wiper lip 412 separated by an open U shaped annular groove 413, where the wiper lip 412 extends laterally and radially inwardly from the intersection thereof with the annular base 410. Solid backing ring 402 includes a circumferential portion 414 surrounding and contacting the outer surface of the ring connection portion 408 of the elastic portion 404, and a radially inwardly projecting portion 416 penetrating inwardly of the base 406. The outer circumference of the solid backing ring 402 is sized to be press fit into the wiper counterbore 372 to be secured therein, positioning the end of the wiper lip 412 to contact the outer circumferential guide surface 350 of the support tube 322 to seal the annular gap between the poppet 254 and the support tube 322, with the open end of the open U-shaped annular groove 413 facing the second body 106. In this orientation, the wiper 400 will prevent passage of abrasive or particulate laden fluid inwardly of that annulus.

As the poppet 254 reciprocates on the guiding support tube 322, the pressure in the volume between the poppet 254 and the support tube 322 will increase when the poppet 254 moves away from the seat assembly 252 and this motion reduces the volume between the alignment bore base wall 396 of the poppet 254 and the annular spring support wall 360 of the pedestal 256 within which the poppet spring 398 resides, and this pressure will decrease when the poppet 254 moves toward the seat assembly 252 and increases the volume between the alignment bore base wall 396 of the poppet 254 and the annular spring support wall 360 of the pedestal 256 within which the poppet spring 398 resides. To reduce the pressure changes and help maintain the wiper lip 412 on the outer circumferential guide surface 350, a breather vent plug 418 is threaded into the threaded vent plug bore 344 (FIG. 7). The breather vent plug 418 includes, as is known in the art, passages therethrough to allow fluid to pass therethrough but is configured to block the flow of particulates therethrough. Thus, the fluid in the volume between the poppet 254 and the support tube 322 is in fluid communication with the fluid external to (surrounding) the poppet 254, and this fluid can flow through the central vent passage 348 of the guide tube and through the breather vent plug 418 to prevent a high pressure condition in the region between the poppet 254 and the support tube 322.

Referring to FIG. 7, the valve 10 is shown assembled and in a closed position. To assemble the valve 10, after the breather vent plug 418 is positioned in the pedestal 256, the support tube 322 is inserted inwardly of the second end 112 of housing 102 until the outer periphery of the second annular end wall 330 thereof abuts the annular pedestal ledge 132. The second body 106, with the outlet connector 108 configured as a lock nut 230 positioned thereover as shown in FIG. 7, is then connected to the housing by inserting the threaded attachment portion 210 thereof inwardly of the second end 112 of the housing 102 and threading it into the threaded outlet bore 126 until the second securement receiving surface 214 is aligned with the second end threaded set screw bores 140. Fasteners such as set screws 162 are then threaded into the second end threaded set screw bores 140 and grounded against the second securement receiving surface 214 of the second body 106.

As also shown in FIG. 7, lock nut 230 is here configured to include a circumferential ring shaped body 454 from which a plurality, here three, wings 448 extend radially outwardly. The inner circumferential surface of the ring shaped body 454 includes a major diameter threaded bore 456 extending inwardly from an outer annular end face 452 of the lock nut 230, the major diameter threaded bore 456 including threads therein. A minor diameter wing nut bore 460 extends inwardly of the housing facing annular end wall 464 of the lock nut 230, and ends at an annular flanging surface 462 extending radially outwardly therefrom to the inner terminus of the major diameter threaded bore 456. When valve 10 is assembled, the threads of the major diameter threaded bore 456 are threaded over a vent device (not shown), for example an outer surface threaded conduit, configured to stab into the outlet side tapered outlet bore 192. As the lock nut is threaded onto the vent device, the flanging surface contacts the flange ledge surface 222 of the second body 106, to secure the second body 106, and thus the valve, to a vent device.

Next the poppet 254, having the wiper 400 disposed in the wiper counterbore 372 and a first end of the poppet spring 398 connected to or located against the alignment bore base wall 396, is inserted inwardly of the first end 110 of the housing 102 to position the poppet 254 and the wiper lip 412 over the support tube 322. The sleeve 264, and then the seat ring 262, are inserted into the first end 110 of the housing 102. Here, the seat ring 262 will not be in its final position in the sleeve bore 120, as the poppet spring 398 has sufficient force to push the poppet 254 well outwardly of the second annular sleeve end wall 268 in the direction of the first end 110 of the housing 102, to prevent the seat assembly from contacting the second annular sleeve end wall 268. The first body 104 is then threaded into the first end 110 of the housing 102 by threading the outer threaded housing connection surface 152 of the housing connection hub 146 into the circumferential threaded surface 119 until the pilot boss 290 of the first retaining ring is received in the retaining ring alignment bore 182 of the first body and the first body 104 pushes the seat ring 262 into contact with the second annular sleeve end wall 268. Thence, second set screws 162 are threaded into the first end threaded set screw bores 139 and grounded against the fixing hub 150.

Herein, a valve is provided for relieving an over-pressure condition in a fluid line. The valve includes a valve body 100 having a housing 102 and opposed first and second bodies 104, 106 connected thereto. A poppet 254 is reciprocatably guided along a portion of a pedestal 256 in the housing 102, and the poppet includes an annular seat-engaging surface that is, during normal pressure conditions in a flow bore extending through the first body 104, engaged against a seal ring in a seat assembly 252. During overpressure conditions in the flow bore extending through the first body, the poppet 254 will move away from the seat assembly 252, allowing the fluid therein to flow through the first body, the housing 102, and the second body 106 to relieve the overpressure condition. The poppet 254 then moves in the housing to press the annular seat-engaging surface of the poppet 254 against the seat assembly 252, to fluidly isolate the flow bore in the first body from the interior of the housing 102. Here, to maintain the rotational alignment of the poppet 254 with the pedestal 256, a rotation correction or rotation alignment feature is provided, which resets the poppet 254 into its original rotational alignment with the pedestal 256 during each full retraction of the poppet 254 from the seat assembly 252. Specifically, when the poppet 254 retracts from the seat ring 262, it may twist or rotate slightly. Over multiple retracting and re-contacting cycles, the poppet may rotate which can affect the performance of the valve 10. Here, to reset the orientation of the poppet 254 to its original orientation, as shown in FIG. 12, when the poppet 254 fully retracts from the seat ring 262, the pin ends 384 of the pins 382 extending inwardly of the poppet 254 contact the rounded detents 354, resetting the poppet 254 to an original orientation. Note, the arcuate spacing between the centers of the rounded detents 354 is greater than the likely twist or rotation of the poppet over any single valve opening and closing cycle, so that the rounded detents 354 ensure that the poppet orientation is in the correct orientation after each full retraction of the poppet 254 from the seat ring 262.

Thus, a check valve useful for the relief of pressure in a high-pressure abrasive laden fluid is provided. Here, the seat assembly is configured to direct the abrasive laden fluid through the valve 10 with reduced erosion, by redirecting the flow direction adjacent the inner wall of the housing or the inner wall of the sleeve. Additionally, a seat assembly for securing the seat ring helps prevent extrusion of the seat ring and maintain its alignment with the poppet. Providing a wiper and a breather device allows venting of the space between the pedestal and the inner surfaces of the poppet. The ability to ensure the orientation of the poppet keeps the poppet in the same rotational orientation in the valve through its service life. The narrowing of the inlet body flow body bore 174 in the flow direction from the protected equipment helps accelerate the high-pressure fluid into the stagnation bore of the poppet 254 when the valve 10 opens, allowing for faster venting of the overpressure condition. The large relative size of the arcuate openings 332 compared to the annular gap between the poppet 254 and the seat ring 262 when the poppet initially retracts ensures no choking of the flow downstream of the annulus within the valve during the initial stage of the high-pressure relief.

What is claimed is:

1. A valve, comprising:
   an inlet;
   an annular seat;
   a poppet having an annular body having an inner volume having an open end and an annular seat facing surface selectively contactable with the annular seat, the annular seat facing surface facing away from the inner volume of the poppet with an inner end wall disposed therebetween and between the annular seat facing surface and the open end; and,
   at least one alignment pin extending inwardly of the inner volume of the poppet;
   an outlet fluidly connectable to the inlet; and
   an alignment tube disposed between the outlet and the inlet, the alignment tube extending inwardly of the open end of the inner volume of the poppet and including an alignment feature thereon configured to at least partially receive the alignment pin therein when the annular seat-facing surface of the poppet is retracted from the seat.

2. The valve of claim 1, wherein:
   the alignment tube further includes an alignment tube first end facing the inner end wall of the poppet, the alignment tube first end including the alignment feature thereon.

3. The valve of claim 2, wherein the alignment feature comprises at least one detent extending inwardly of the alignment tube first end face.

4. The valve of claim 3, wherein the pin is circular in cross section, and the detent has a curved surface extending inwardly of the alignment tube first end face.

5. The valve of claim 2, further including a pedestal base connected to the alignment tube distal to the alignment tube end face.

6. The valve of claim 5, wherein the pedestal base further includes at least one flow passage extending therethrough.

7. The valve of claim 5, further comprising a biasing member, in compression, extending between the pedestal base and the inner end wall of the poppet.

8. The valve of claim 1, wherein the inlet further comprises an inlet bore tapering inwardly on the direction of the outlet body.

9. A valve, comprising:

an inlet;

an annular seat;

an outlet;

a poppet having an annular body having an inner volume, an annular first end wall and an annular second wall, the annular second wall facing the annular seat and selectively contactable with the annular seat, and an inner circumferential surface extending inwardly of the poppet from the first annular end wall;

a support tube extending inwardly of the inner volume of the poppet, the support tube including an outer circumferential wall having a circumference less than the circumference of the inner circumferential surface of the poppet such that a gap is present therebetween; and a wiper disposed adjacent the first annular wall of the poppet an including a circumferential seal spanning the gap between an inner circumferential surface of the poppet and a first outer circumferential surface of the support tube.

10. The valve of claim 9, further comprising:

the support tube includes a first end facing the inlet, a second end facing the outlet, and a passage extending within the support tube between the first end and the second end thereof.

11. The valve of claim 10, wherein the passage includes a breather bore located adjacent to the first end of the support tube; and a breather is disposed in the breather bore.

12. The valve of claim 11, wherein the passage includes a spring recess extending inwardly of the second end thereof;

the poppet includes an inner end wall bounding the inner volume of the poppet distal to the first annular end wall of the poppet;

the support tube includes a base portion having a greater circumference than the first outer circumferential surface of the support tune, the base portion including an annular support wall; and a biasing member extends between the annular support wall and the inner end wall of the poppet.

13. A valve, comprising;

a housing having a central through bore, a first threaded housing end and a second threaded housing end;

a first body having a first body flow passage and a first body threaded end, and a first attachment surface disposed between the first threaded end and the first body flow passage;

a second body having a second body flow passage and a second body threaded end, and a second attachment surface disposed between the second threaded end and the second body flow passage;

the first body threaded end received in the first threaded housing and, and a first retainer extending from the housing and into contact with the first attachment surface; and the second body threaded end received in the second threaded housing and, and a second retainer extending from the housing and into contact with the second attachment surface.

14. The valve of claim 13, wherein the hosing further comprises at least one first through threaded passage extending therethrough and the first retainer includes an outer threaded surface and is received in the first through threaded passage.

15. The valve of claim 13, wherein the second body includes an outer circumferential surface and a circumferential flange extending outwardly from the outer circumferential surface, the circumferential; and a connector comprising an inner annular threaded surface and an inwardly extending ledge.

16. A valve, comprising:

a housing having a central through bore, a first housing open end and a second housing open end;

a first body having a first body flow passage and a retaining ring counterbore, at least a portion of the first body received in the first housing open end;

a second body having a second body flow passage and at least a portion of the second body received in the first housing open end;

a seat assembly comprising a first retaining ring, a second retaining ring, and a seat supported by the first retaining ring and the second retaining ring; and a poppet reciprocally received in the housing.

17. The valve of claim 16, wherein the first retaining ring includes an alignment boss extending inwardly of the retaining ring counterbore in the first body.

18. The valve of claim 16, wherein the first retaining ring further comprises a circumferential ledge bounding an annular seat and second retaining ring contacting surface, and the circumferential ledge includes a protrusion thereon extending inwardly of the seat.

19. The valve of claim 18, wherein the annular seat and second retaining ring contacting surface includes a circumferential relief recess extending inwardly thereof.

20. The valve of claim 16, wherein the seat further includes a through flow passage and an outer circumferential surface, the outer circumferential surface including a spacing wall and a circumferential rounded protrusion extending radially outwardly from the spacing wall, an first annular tapered surface facing the first retaining ring and a second tapered annular surface facing the poppet.

* * * * *